(12) United States Patent
Strohmann et al.

(10) Patent No.: US 11,436,857 B1
(45) Date of Patent: Sep. 6, 2022

(54) ULTRASONIC SENSOR SYSTEM WITH HIGHER-FREQUENCY AND LOWER-FREQUENCY AREAS

(71) Applicant: QUALCOMM Incorporated, San Diego, CA (US)

(72) Inventors: Jessica Liu Strohmann, Cupertino, CA (US); Yipeng Lu, Davis, CA (US); Hrishikesh Vijaykumar Panchawagh, Cupertino, CA (US); Kostadin Dimitrov Djordjev, Los Gatos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/446,438

(22) Filed: Aug. 30, 2021

(51) Int. Cl.
   *G06V 40/13* (2022.01)
   *H01L 27/20* (2006.01)
   *H01L 25/18* (2006.01)
   *G06V 40/12* (2022.01)

(52) U.S. Cl.
   CPC ...... *G06V 40/1306* (2022.01); *G06V 40/1394* (2022.01); *H01L 25/18* (2013.01); *H01L 27/20* (2013.01)

(58) Field of Classification Search
   CPC ............ G06V 40/1306; G06V 40/1394; H01L 25/18; H01L 27/20
   See application file for complete search history.

(56) References Cited

U.S. PATENT DOCUMENTS

| | | | |
|---|---|---|---|
| 2018/0046836 A1* | 2/2018 | Hinger | G01S 7/52079 |
| 2018/0129849 A1* | 5/2018 | Strohmann | G06F 21/32 |
| 2018/0276440 A1* | 9/2018 | Strohmann | G06V 40/1359 |

* cited by examiner

*Primary Examiner* — Premal R Patel
(74) *Attorney, Agent, or Firm* — Qualcomm Incorporated

(57) ABSTRACT

An apparatus may include an ultrasonic sensor system having an ultrasonic transceiver layer, a thin-film transistor (TFT) layer and a frequency-differentiating layer. In some examples, the frequency-differentiating layer may include a first frequency-differentiating layer area corresponding to a lower-frequency area of the ultrasonic sensor system. The first frequency-differentiating layer area may include a first material having a first acoustic impedance. In some such examples, the frequency-differentiating layer may include a second frequency-differentiating layer area corresponding to a higher-frequency area of the ultrasonic sensor system. The second frequency-differentiating layer area may include a second material having a second acoustic impedance. The first acoustic impedance may, for example, be higher than the second acoustic impedance.

34 Claims, 14 Drawing Sheets

ULTRASONIC SENSOR SYSTEM WITH HIGHER-FREQUENCY AND LOWER-FREQUENCY AREAS

TECHNICAL FIELD

This disclosure relates generally to sensor devices and related methods, including but not limited to ultrasonic sensor systems and methods for using such systems.

DESCRIPTION OF THE RELATED TECHNOLOGY

Biometric authentication can be an important feature for controlling access to devices, etc. Many existing products include some type of biometric authentication. Although some existing biometric authentication technologies provide satisfactory performance, improved methods and devices would be desirable.

SUMMARY

The systems, methods and devices of the disclosure each have several innovative aspects, no single one of which is solely responsible for the desirable attributes disclosed herein.

One innovative aspect of the subject matter described in this disclosure may be implemented in an apparatus. In some examples, the apparatus may be, or may reside within, a mobile device. The apparatus may include ultrasonic sensor system. The ultrasonic sensor system may include an ultrasonic transceiver layer, a frequency-differentiating layer and a thin-film transistor (TFT) layer residing between the ultrasonic transceiver layer and the frequency-differentiating layer. The TFT layer may be proximate a first side of the frequency-differentiating layer. According to some examples, the apparatus may include a display stack proximate a second side of the frequency-differentiating layer.

The frequency-differentiating layer may include a first frequency-differentiating layer area corresponding to a lower-frequency area of the ultrasonic sensor system and including a first material having a first acoustic impedance. The frequency-differentiating layer may include a second frequency-differentiating layer area corresponding to a higher-frequency area of the ultrasonic sensor system and including a second material having a second acoustic impedance. The first acoustic impedance may, for example, be higher than the second acoustic impedance. According to some implementations, the frequency-differentiating layer may be, or may include, an adhesive layer in the second frequency-differentiating layer area.

In some implementations, the first material may be, or may include, a high-impedance layer. In some examples, the high-impedance layer may be, or may include, steel, nickel, cupronickel, copper or glass. According to some implementations, the second material may be, or may include, a low-impedance layer. In some examples, the low-impedance layer may be, or may include, at least one of polyimide, polycarbonate or polyethylene terephthalate.

According to some examples, the frequency-differentiating layer further may be, or may include, a first resonator in the second frequency-differentiating layer area. In some such examples, the first resonator may include the second material. According to some examples, the TFT layer may be proximate a first side of the first resonator and a high-impedance layer may be proximate a second side of the first resonator. The high-impedance layer may, for example, have a higher acoustic impedance than that of the second material. In some examples, the first resonator may have a thickness corresponding to half of a wavelength. The wavelength may, in some instances, correspond to a peak frequency of the higher-frequency area of the ultrasonic sensor system. In some examples, the peak frequency of the higher-frequency area may be in the range of 10 MHz to 20 MHz.

In some examples, the frequency-differentiating layer further may be, or may include, a second resonator in the second frequency-differentiating layer area. The second resonator may include the ultrasonic transceiver layer. The TFT layer may, in some examples, be proximate a first side of the second resonator. The second resonator may, in some instances, include an electrode layer of the ultrasonic sensor system. According to some examples, the second resonator may have a thickness corresponding to one quarter of a wavelength corresponding to a peak frequency of the higher-frequency area of the ultrasonic sensor system.

In some instances, the frequency-differentiating layer may be, or may include, a second resonator in the first frequency-differentiating layer area. The second resonator may, in some examples, include the TFT layer and the ultrasonic transceiver layer. According to some examples, the first material may be proximate a first side of the second resonator. In some such examples, the second resonator may include an electrode layer of the ultrasonic sensor system. In some examples, the second resonator may have a thickness corresponding to one quarter of a wavelength. The wavelength may correspond to a peak frequency of the lower-frequency area of the ultrasonic sensor system. The peak frequency of the lower-frequency area may, for example, be in the range of 1 MHz to 10 MHz.

In some examples, the apparatus may include a control system. The control system may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof.

According to some examples, the control system may be configured to control the ultrasonic transceiver layer to transmit a first ultrasonic wave through the first frequency-differentiating layer area The first ultrasonic wave may include a first peak frequency. The control system may be configured to control the ultrasonic transceiver layer to transmit a second ultrasonic wave through the second frequency-differentiating layer area. The second ultrasonic wave may include a second peak frequency. The control system may be configured to receive, from the ultrasonic sensor system, first signals corresponding to reflections of the first ultrasonic wave from a first portion of a target object positioned on an outer surface of the apparatus. The control system may be configured to receive, from the ultrasonic sensor system, second signals corresponding to reflections of the second ultrasonic wave from a second portion of the target object.

In some implementations, the control system may be configured to perform an authentication process that is based, at least in part, on the first signals, the second signals or combinations thereof. According to some implementations, the first signals may include sub-epidermal layer information corresponding to reflections of the first ultrasonic wave received from the first portion of the target object within a time interval corresponding to a sub-epidermal region. In some examples, the control system may be configured to perform a liveness detection process that is based, at least in part, on the first signals.

Other innovative aspects of the subject matter described in this disclosure may be implemented in an apparatus. In some examples, the apparatus may be, or may reside within, a mobile device. The apparatus may include ultrasonic sensor system. The ultrasonic sensor system may include an ultrasonic transceiver layer and a frequency-differentiating layer proximate a first side of the ultrasonic transceiver layer.

According to some examples, the frequency-differentiating layer may include a first frequency-differentiating layer area corresponding to a lower-frequency area of the ultrasonic sensor system and including a first material having a first acoustic impedance and a first thickness. In some such examples, the frequency-differentiating layer may include a second material having a second acoustic impedance. The first acoustic impedance may, in some examples, be higher than the second acoustic impedance.

In some examples, the frequency-differentiating layer may include a second frequency-differentiating layer area corresponding to a higher-frequency area of the ultrasonic sensor system and including the first material having a second thickness and the second material. In some instance, the first thickness may be greater than the second thickness. In some implementations, the first material of the frequency-differentiating layer may be, or may include, an electrode layer of the ultrasonic sensor system.

In some implementations, the first material may be, or may include, a conductive portion of printed circuit board material. In some such examples, the second material may be, or may include, an insulating portion of the printed circuit board material.

According to some implementations, the apparatus may include a high-impedance layer proximate a second side of the ultrasonic transceiver layer. In some such examples, the high-impedance layer may have a higher acoustic impedance than that of the ultrasonic transceiver layer. In some examples, the high-impedance layer may be, or may include, a TFT layer and/or a glass layer.

In some implementations, the apparatus may include a display stack proximate a first side of the high-impedance layer. In some such examples, the ultrasonic transceiver layer may be proximate a second side of the high-impedance layer.

Still other innovative aspects of the subject matter described in this disclosure may be implemented in an apparatus. In some examples, the apparatus may be, or may reside within, a mobile device. The apparatus may include ultrasonic sensor system. The ultrasonic sensor system may include a TFT layer, an ultrasonic transceiver layer, a frequency-differentiating layer and an electrode layer residing between the ultrasonic transceiver layer and the frequency-differentiating layer. In some examples, the electrode layer may be proximate a first side of the frequency-differentiating layer. According to some examples, the apparatus may include a display stack proximate a second side of the frequency-differentiating layer.

In some implementations, the frequency-differentiating layer may include a first frequency-differentiating layer area corresponding to a lower-frequency area of the ultrasonic sensor system and including a first material having a first acoustic impedance. According to some examples, the frequency-differentiating layer may include a second frequency-differentiating layer area corresponding to a higher-frequency area of the ultrasonic sensor system and including a second material having a second acoustic impedance. The first acoustic impedance may, in some examples, be higher than the second acoustic impedance.

According to some implementations, the first material may be, or may include, steel, nickel, cupronickel, copper, glass or combinations thereof. In some examples, the second material may be, or may include, polyimide, polycarbonate, polyethylene terephthalate, or combinations thereof.

Yet other innovative aspects of the subject matter described in this disclosure may be implemented in an apparatus. In some examples, the apparatus may be, or may reside within, a mobile device. The apparatus may include a display stack and an ultrasonic sensor system. The display stack may include, or may form, at least a first resonator. The first resonator may, in some examples, have a first resonator peak frequency in a first frequency range.

The ultrasonic sensor system may include an ultrasonic transceiver layer, an electrode layer proximate a first side of the ultrasonic transceiver layer and a TFT layer proximate a second side of the ultrasonic transceiver layer. In some implementations, a second resonator of the apparatus may include one or more layers the ultrasonic sensor system. The second resonator may, in some instances, have a second resonator peak frequency in the first frequency range.

According to some implementations, the apparatus may include a high-impedance layer residing between the ultrasonic sensor system and the display stack. In some implementations, the apparatus may include a low-impedance layer residing between the ultrasonic sensor system and the high-impedance layer. In some examples, a third resonator may include the low-impedance layer. In some examples, the third resonator may be bounded by the high-impedance layer and the TFT layer. In some instances, the third resonator may have a third resonator peak frequency in the first frequency range.

In some implementations, the apparatus may include an adhesive layer residing between the high-impedance layer and the ultrasonic sensor system. In some such examples, the second resonator may include the adhesive layer. According to some examples, the second resonator may be bounded by the high-impedance layer.

Other innovative aspects of the subject matter described in this disclosure may be implemented in a method. In some examples, the method may involve controlling one or more of the disclosed devices. According to some examples, the method may involve controlling one or more of the disclosed devices to perform an authentication process.

According to some examples, a method may involve controlling an ultrasonic transceiver layer of an ultrasonic sensor system to transmit at least a first ultrasonic wave through a first frequency-differentiating layer area. The first ultrasonic wave(s) may include a first peak frequency. The method may involve controlling the ultrasonic transceiver layer to transmit at least a second ultrasonic wave through a second frequency-differentiating layer area. The second ultrasonic wave(s) may include a second peak frequency. The method may involve receiving, from the ultrasonic sensor system, first signals corresponding to reflections of the first ultrasonic wave(s) from a first portion of a target object positioned on an outer surface of an apparatus that includes the ultrasonic sensor system. The method may involve receiving, from the ultrasonic sensor system, second signals corresponding to reflections of the second ultrasonic wave(s) from a second portion of the target object.

Some or all of the operations, functions and/or methods described herein may be performed by one or more devices according to instructions (e.g., software) stored on one or more non-transitory media. Such non-transitory media may include memory devices such as those described herein, including but not limited to random access memory (RAM) devices, read-only memory (ROM) devices, etc. Accordingly, some innovative aspects of the subject matter described in this disclosure can be implemented in one or more non-transitory media having software stored thereon.

BRIEF DESCRIPTION OF THE DRAWINGS

Details of one or more implementations of the subject matter described in this specification are set forth in the accompanying drawings and the description below. Other features, aspects, and advantages will become apparent from the description, the drawings, and the claims. Note that the relative dimensions of the following figures may not be drawn to scale. Like reference numbers and designations in the various drawings indicate like elements.

DETAILED DESCRIPTION

Figure 1A:
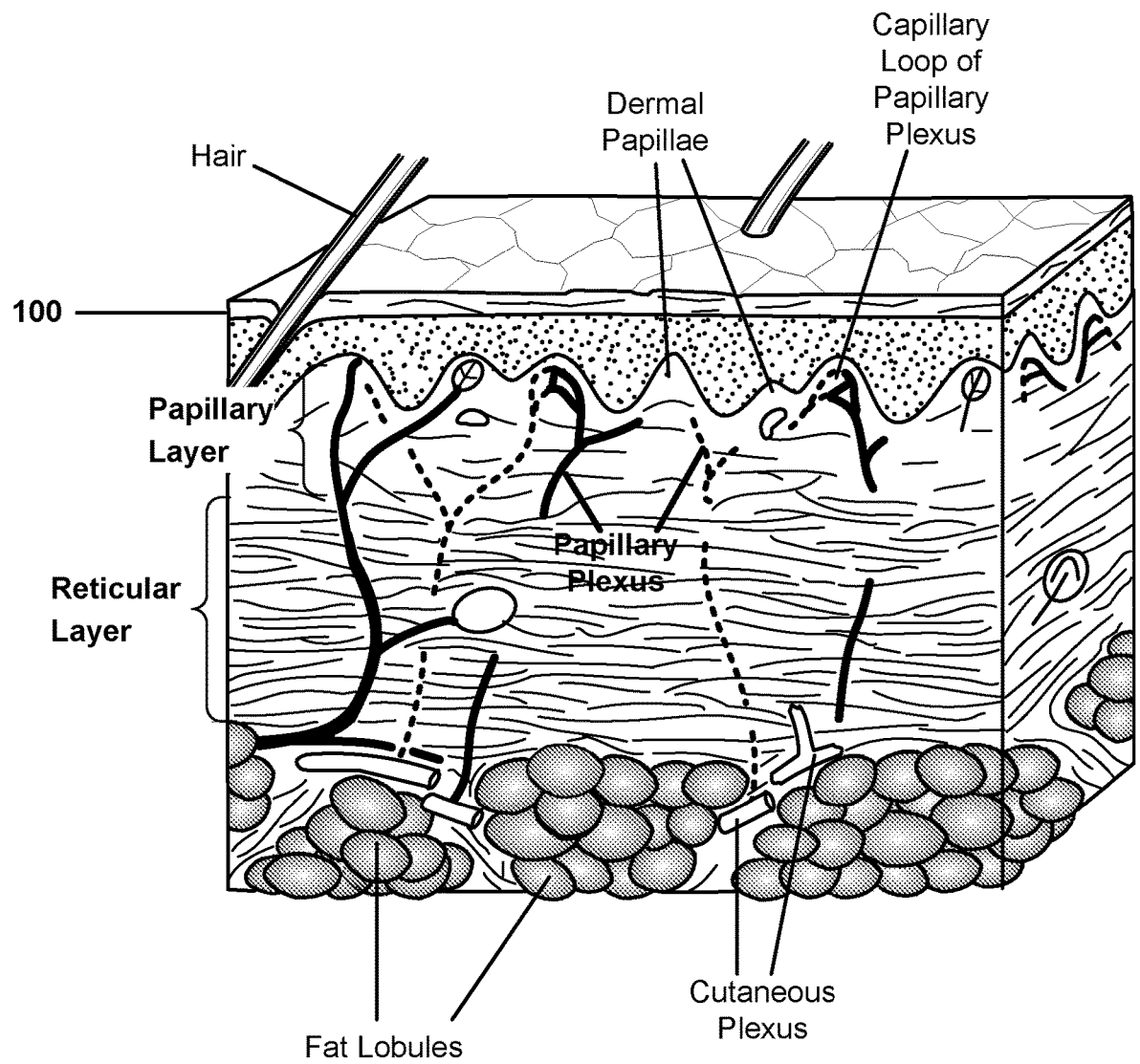
FIG. 1A shows examples of sub-epidermal features.

The following description is directed to certain implementations for the purposes of describing the innovative aspects of this disclosure. However, a person having ordinary skill in the art will readily recognize that the teachings herein may be applied in a multitude of different ways. The described implementations may be implemented in any device, apparatus, or system that includes a biometric system as disclosed herein. In addition, it is contemplated that the described implementations may be included in or associated with a variety of electronic devices such as, but not limited to: mobile telephones, multimedia Internet enabled cellular telephones, mobile television receivers, wireless devices, smartphones, smart cards, wearable devices such as bracelets, armbands, wristbands, rings, headbands, patches, etc., Bluetooth® devices, personal data assistants (PDAs), wireless electronic mail receivers, hand-held or portable computers, netbooks, notebooks, smartbooks, tablets, printers, copiers, scanners, facsimile devices, global positioning system (GPS) receivers/navigators, cameras, digital media players (such as MP3 players), camcorders, game consoles, wrist watches, clocks, calculators, television monitors, flat panel displays, electronic reading devices (e.g., e-readers), mobile health devices, computer monitors, auto displays (including odometer and speedometer displays, etc.), cockpit controls and/or displays, camera view displays (such as the display of a rear view camera in a vehicle), electronic photographs, electronic billboards or signs, projectors, architectural structures, microwaves, refrigerators, stereo systems, cassette recorders or players, DVD players, CD players, VCRs, radios, portable memory chips, washers, dryers, washer/dryers, parking meters, packaging (such as in electromechanical systems (EMS) applications including microelectromechanical systems (MEMS) applications, as well as non-EMS applications), aesthetic structures (such as display of images on a piece of jewelry or clothing) and a variety of EMS devices. The teachings herein also may be used in applications such as, but not limited to, electronic switching devices, radio frequency filters, sensors, accelerometers, gyroscopes, motion-sensing devices, magnetometers, inertial components for consumer electronics, parts of consumer electronics products, steering wheels or other automobile parts, varactors, liquid crystal devices, electrophoretic devices, drive schemes, manufacturing processes and electronic test equipment. Thus, the teachings are not intended to be limited to the implementations depicted solely in the Figures, but instead have wide applicability as will be readily apparent to one having ordinary skill in the art.

Many existing products, including but not limited to mobile phones, are configured for fingerprint-based authentication. However, even premium-tier mobile phone manufacturers have had their devices' fingerprint-based authentication systems successfully hacked shortly after product introduction. In some instances, spoofing may involve using a finger-like object that includes silicone rubber, polyvinyl acetate (white glue), gelatin, glycerin, etc., with a fingerprint pattern of a rightful user formed on an outside surface. In some cases, a hacker may form a fingerprint pattern of a rightful user on a sleeve or partial sleeve that can be slipped over or on the hacker's finger. Authentication methods that are based, at least in part, on sub-epidermal features may be more reliable than those based on fingerprints alone, in part because sub-epidermal features are more difficult to spoof.

It can be challenging to design an ultrasonic sensor system that is suitable for imaging both fingerprints and sub-epidermal features. For example, relatively higher frequencies (e.g., 10 MHz or more) are suitable for fingerprint imaging, whereas relatively lower frequencies (e.g., less than 10 MHz) are suitable for imaging sub-epidermal features. If an ultrasonic sensor system is configured to transmit both higher-frequency and lower-frequency ultrasonic waves, "cross-talk" can result.

Some disclosed devices include an ultrasonic sensor system that includes a frequency-differentiating layer. In some examples, the frequency-differentiating layer may include a first frequency-differentiating layer area corresponding to a lower-frequency area of the ultrasonic sensor system. The first frequency-differentiating layer area may include a first material having a first acoustic impedance. In some such examples, the frequency-differentiating layer may include a second frequency-differentiating layer area corresponding to a higher-frequency area of the ultrasonic sensor system. The second frequency-differentiating layer area may include a second material having a second acoustic impedance. The first acoustic impedance may, for example, be higher than the second acoustic impedance.

Accordingly, the ultrasonic sensor system may be configured to transmit and receive ultrasonic waves at two or more peak frequencies. According to some examples, ultrasonic waves that are transmitted from the first frequency-differentiating layer area may have relatively lower frequencies that are suitable for imaging sub-epidermal features. In some examples, ultrasonic waves that are transmitted from the second frequency-differentiating layer area may have relatively higher peak frequencies that are suitable for fingerprint imaging.

Particular implementations of the subject matter described in this disclosure may be implemented to realize one or more of the following potential advantages. In some examples, an ultrasonic sensor system may be configured to transmit ultrasonic waves at two or more peak frequencies. For example, a ultrasonic sensor system may be configured to transmit ultrasonic waves having relatively higher peak frequencies that are suitable for fingerprint imaging, as well as ultrasonic waves having relatively lower frequencies that are suitable for imaging sub-epidermal features. In some examples, the same ultrasonic transceiver layer may be used to generate both the higher peak frequencies and the lower peak frequencies. According to some examples, the same layer may function as both a frequency-differentiating layer and an electrode layer. Such implementations can potentially be fabricated relatively more quickly and with relatively fewer materials, potentially saving both time and money.

FIG. 1A shows examples of sub-epidermal features. As used herein, the term "sub-epidermal features" may refer to any of the tissue layers that underlie the epidermis 100, including the dermis, the papillary layer, the reticular layer, the subcutis, etc., and any blood vessels, lymph vessels, sweat glands, hair follicles, hair papilla, fat lobules, etc., that may be present within such tissue layers. Accordingly, sub-epidermal features also may include features not shown in FIG. 1A, such as muscle tissue, bone material, etc.

Some disclosed implementations may be configured to perform authentication methods that are based, at least in part, on sub-epidermal features. Some such implementations may include an ultrasonic sensor system that is capable of obtaining image data from the epidermis, such as fingerprint image data, as well as image data that corresponds to sub-epidermal features. Some implementations may be configured to perform a liveness detection process that is based, at least in part, on image data that corresponds to sub-epidermal features. Data received from an ultrasonic sensor system may be referred to herein as "ultrasonic image data," "image data," etc., although the data will generally be received from the ultrasonic sensor system in the form of electrical signals. Accordingly, without additional processing such image data would not necessarily be perceivable by a human being as an image.

Figure 1B:
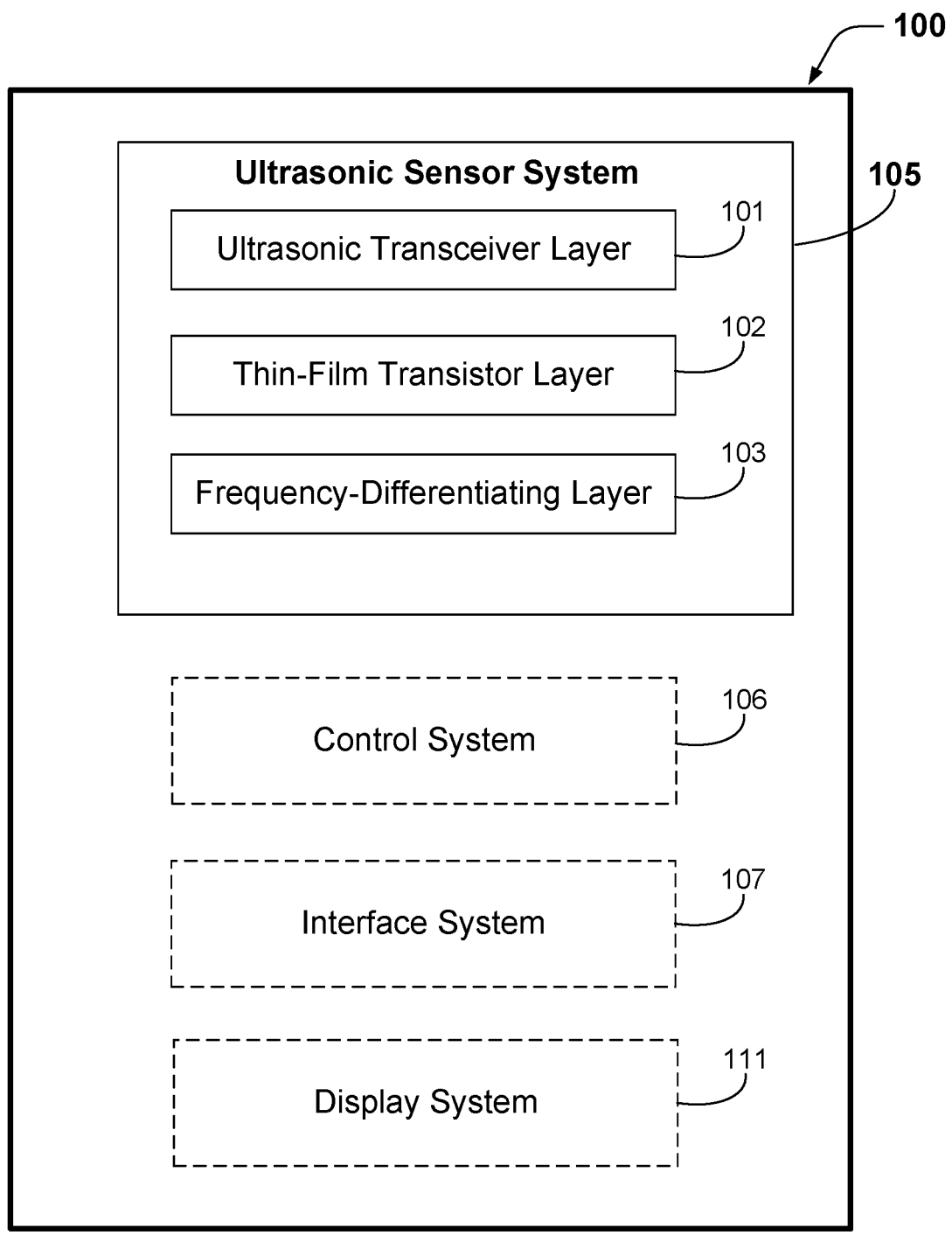
FIG. 1B is a block diagram that shows example components of an apparatus according to some disclosed implementations.

FIG. 1B is a block diagram that shows example components of an apparatus according to some disclosed implementations. As with other disclosed implementations, the numbers, types and arrangements of elements shown in FIG. 1B are merely presented by way of example. Although not shown in FIG. 1B, the apparatus 100 may include other components, such as a cover (which may be, or may include, a cover glass), one or more adhesive layers, one or more electrode layers, etc. Some examples are described below.

According to this example, the apparatus 100 includes an ultrasonic sensor system 105. In this implementation, the ultrasonic sensor system 105 includes an ultrasonic transceiver layer 101, a thin-film transistor (TFT) layer 102 and a frequency-differentiating layer 103. In some examples, the frequency-differentiating layer 103 may reside between the ultrasonic transceiver layer 101 and a display stack of the display system 111. In some alternative examples, the ultrasonic transceiver layer 101 may reside between the frequency-differentiating layer 103 and a display stack of the display system 111.

In this example, the ultrasonic transceiver layer 101 is configured to function as both an ultrasonic transmitter and an ultrasonic receiver. According to some implementations, the ultrasonic transceiver layer 101 may be a single piezoelectric layer, whereas in other implementations the ultrasonic transceiver layer 101 may be a multilayer piezoelectric structure, or an array of such structures.

For example, in some implementations, the ultrasonic transceiver layer 101 may include a piezoelectric layer, such as a layer of PVDF polymer or a layer of PVDF-TrFE copolymer. In some implementations, other piezoelectric materials may be used in the ultrasonic transceiver layer 101, such as aluminum nitride (AlN) or lead zirconate titanate (PZT). Some alternative implementations may include separate ultrasonic transmitter and ultrasonic receiver layers.

The ultrasonic transceiver layer 101 may, in some alternative examples, include an array of ultrasonic transducer elements, such as an array of piezoelectric micromachined ultrasonic transducers (PMUTs), an array of capacitive micromachined ultrasonic transducers (CMUTs), etc. In some such examples, a piezoelectric receiver layer, PMUT elements in a single-layer array of PMUTs, or CMUT elements in a single-layer array of CMUTs, may be used as ultrasonic transmitters as well as ultrasonic receivers.

The TFT layer 102 may be a type of metal-oxide-semiconductor field-effect transistor (MOSFET) made by depositing thin films of an active semiconductor layer as well as a dielectric layer and metallic contacts over a substrate. In some examples, the substrate is a non-conductive material such as glass. According to some implementations, the TFT layer 102 may have a thickness that is in the range of 50 microns to 400 microns.

According to some examples, the frequency-differentiating layer 103 may include a first frequency-differentiating layer area corresponding to a lower-frequency area of the ultrasonic sensor system. In some implementations, the first frequency-differentiating layer area may include a first material having a first acoustic impedance. In some examples, the first material may include a high-impedance layer. In some implementations, the high-impedance layer may include steel, copper, nickel, cupronickel and/or glass.

In some examples, the frequency-differentiating layer 103 may include a second frequency-differentiating layer area corresponding to a higher-frequency area of the ultrasonic sensor system 105. Although the present disclosure uses the terms "lower-frequency area" and "higher-frequency area," some implementations of the ultrasonic sensor system 105 may include more than two areas, each of the areas corresponding with a different peak frequency of the ultrasonic sensor system 105.

In some implementations, the second frequency-differentiating layer area may include a second material having a second acoustic impedance. In some such examples, the first acoustic impedance is higher than the second acoustic impedance. According to some examples, the second material includes a low-impedance layer. In some implementations, the low-impedance layer may include a plastic layer and/or an adhesive layer. According to some examples, the low-impedance layer may include polyimide, polycarbonate and/or polyethylene terephthalate.

In some examples, the apparatus 100 may include a control system 106, an interface system 107 and/or a display system 111. The TFT layer 102 may, in some implementations, reside proximate the display system 111, e.g., under the display system 111. In some implementations, the optional display system 111 may be, or may include, a light-emitting diode (LED) display, such as an organic light-emitting diode (OLED) display.

The control system 106 may include one or more general purpose single- or multi-chip processors, digital signal processors (DSPs), application specific integrated circuits (ASICs), field programmable gate arrays (FPGAs) or other programmable logic devices, discrete gates or transistor logic, discrete hardware components, or combinations thereof. The control system 106 also may include (and/or be configured for communication with) one or more memory devices, such as one or more random access memory (RAM) devices, read-only memory (ROM) devices, etc. Accordingly, the apparatus 100 may have a memory system that includes one or more memory devices, though the memory system is not shown in FIG. 1B. The control system 106 may be capable of receiving and processing data from the ultrasonic transceiver layer 101 and/or from an array of sensor pixels, e.g., as described below. In some implementations, functionality of the control system 106 may be partitioned between one or more controllers or processors, such as a dedicated sensor controller and an applications processor of a mobile device.

Some implementations of the apparatus 100 may include an interface system 107. In some examples, the interface system may include a wireless interface system. In some implementations, the interface system may include a user interface system, one or more network interfaces, one or more interfaces between the control system 106 and a memory system and/or one or more interfaces between the control system 106 and one or more external device interfaces (e.g., ports or applications processors).

The interface system 107 may be configured to provide communication (which may include wired or wireless communication, such as electrical communication, radio communication, etc.) between components of the apparatus 100. In some such examples, the interface system 107 may be configured to provide communication between the control system 106 and the ultrasonic receiver layer 101 and/or to provide communication between the control system 106 and an array of sensor pixels. According to some such examples, a portion of the interface system 107 may couple at least a portion of the control system 106 to the ultrasonic receiver layer 101 and/or an array of sensor pixels, e.g., via electrically conducting material.

According to some examples, the interface system 107 may be configured to provide communication between the apparatus 100 and other devices and/or human beings. In some such examples, the interface system 107 may include one or more user interfaces. The interface system 107 may, in some examples, include one or more network interfaces and/or one or more external device interfaces (such as one or more universal serial bus (USB) interfaces). In some implementations, the apparatus 100 may include a memory system. The interface system 107 may, in some examples, include at least one interface between the control system 106 and a memory system.

The apparatus 100 may be used in a variety of different contexts, many examples of which are disclosed herein. For example, in some implementations a mobile device, such as a cell phone, a smart phone, a tablet, a laptop (e.g., a laptop touchpad), etc., may include at least a portion of the apparatus 100. In some implementations, a wearable device may include at least a portion of the apparatus 100. The wearable device may, for example, be a watch, a bracelet, an armband, a wristband, a ring, a headband or a patch. In some implementations, the control system 106 may reside in more than one device. For example, a portion of the control system 106 may reside in a wearable device and another portion of the control system 106 may reside in another device, such as a mobile device (e.g., a smartphone or a tablet computer) and/or a server. The interface system 107 also may, in some such examples, reside in more than one device.

Figure 2:
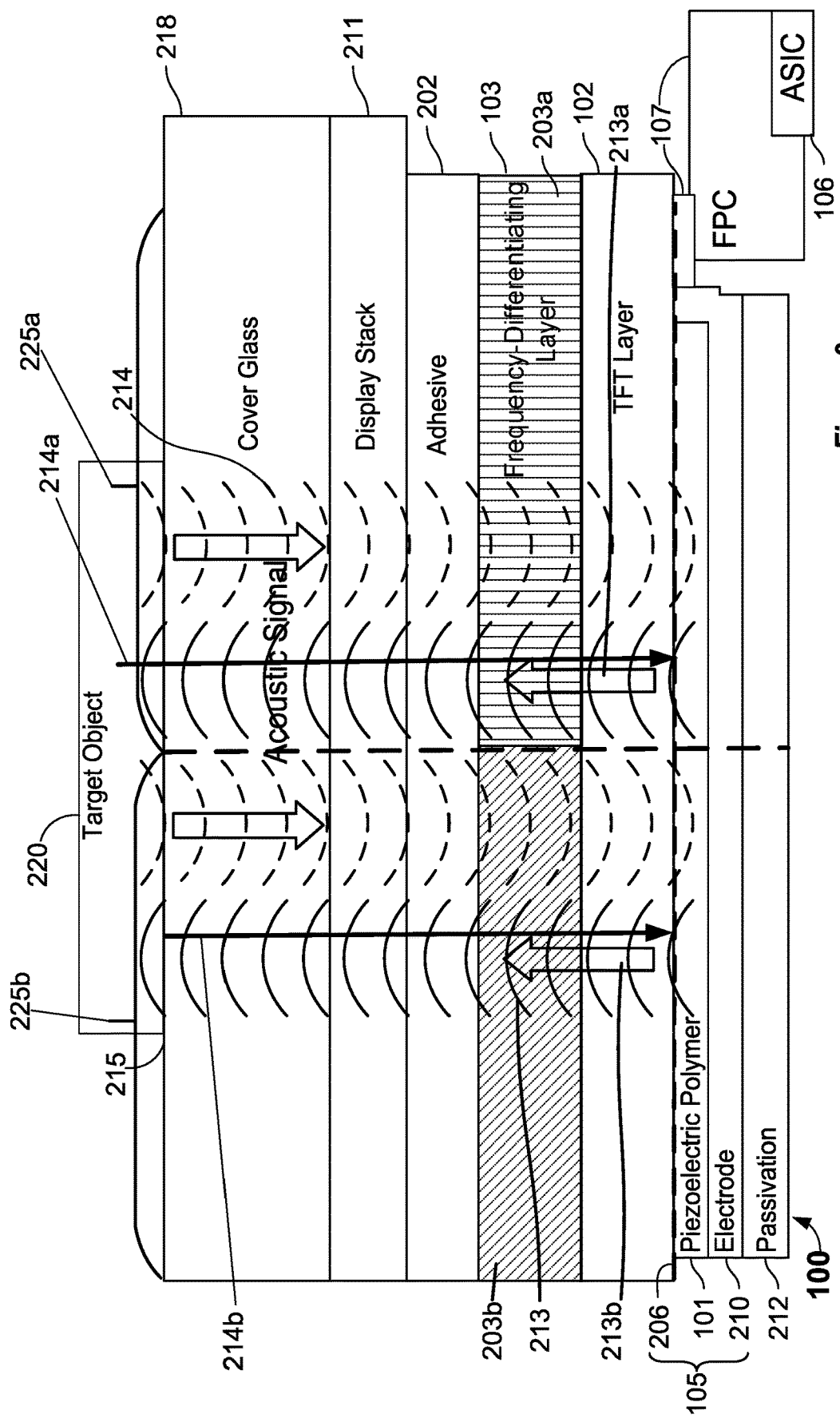
FIG. 2 shows example components of an apparatus according to some disclosed implementations.

FIG. 2 shows example components of an apparatus according to some disclosed implementations. As with other disclosed implementations, the types, number and arrangement of elements shown in FIG. 2 are merely examples. Other implementations may include different types, numbers and/or arrangements of elements. For example, in some alternative examples, the frequency-differentiating layer 103 may reside in a different part of the stack shown in FIG. 2, e.g., the TFT layer 102 and the ultrasonic transceiver layer 101 may reside between the frequency-differentiating layer 103 and the display stack 211. In some alternative examples, the ultrasonic transceiver layer 101 may reside between the TFT layer 102 and the frequency-differentiating layer 103. Moreover, in some instances the ultrasonic sensor system 105 may include more than two frequency-differentiating layer areas. Some such examples are described in detail below. In some implementations, the apparatus 100 may reside within a mobile device, such as a cellular telephone.

Here, the apparatus 100 is an instance of the apparatus 100 shown in FIG. 1B. According to this example, the apparatus 100 is configured to perform at least some of the methods disclosed herein. According to this implementation, the ultrasonic sensor system 105 includes a ultrasonic transceiver layer 101, an electrode layer 210 on one side of the ultrasonic transceiver layer 101 and an array of sensor pixels 206 on a second and opposing side of the ultrasonic transceiver layer 101. In this implementation, the ultrasonic transceiver layer 101 includes one or more piezoelectric polymers.

According to this example, the electrode layer 210 resides between a passivation layer 212 and the ultrasonic transceiver layer 101. In some examples, passivation layer 212 may include an adhesive, such as an epoxy film, a polymer layer (such as a polyethylene terephthalate (PET) layer), etc.

According to this implementation, the TFT layer 102 resides between the ultrasonic transceiver layer 101 and the frequency-differentiating layer 103. In this implementation, the TFT layer 102 is proximate a first side of the frequency-differentiating layer 103 and the display stack 211 is proximate a second side of the frequency-differentiating layer 103. In this example the TFT layer 102 includes a TFT substrate and circuitry for the array of sensor pixels 206. The TFT layer 102 may be a type of metal-oxide-semiconductor field-effect transistor (MOSFET) made by depositing thin films of an active semiconductor layer as well as a dielectric layer and metallic contacts over a TFT substrate. In some examples, the TFT substrate may be a non-conductive material such as glass.

Figure 3A:
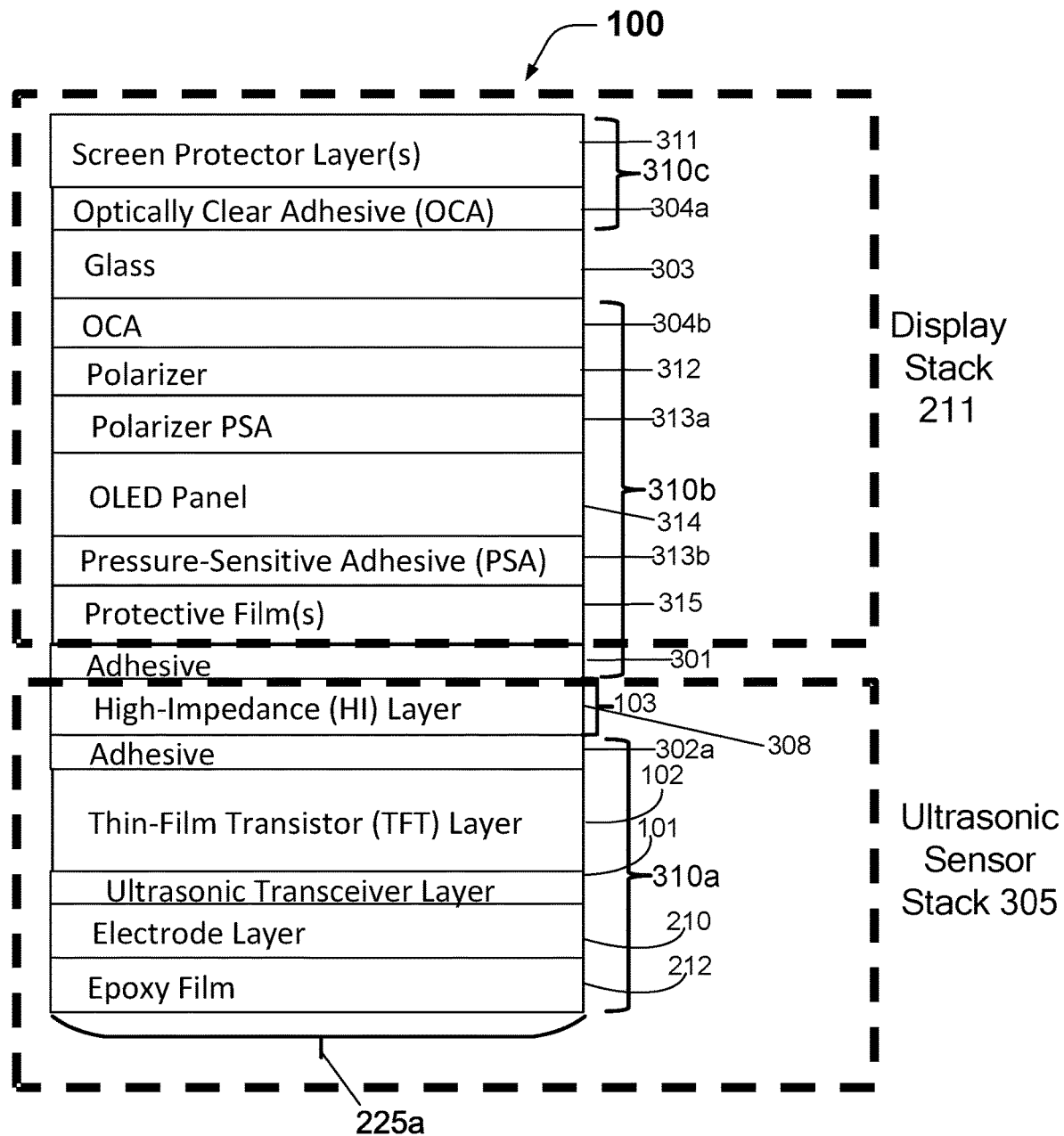
FIG. 3A shows examples of a display stack and an ultrasonic sensor stack in a lower-frequency area of an ultrasonic sensor system.

In this example, the apparatus 100 includes a display stack 211, which is an instance of the display system 111 of FIG. 1B. In some examples, the display stack 211 may be a display stack for an OLED display. A non-limiting example of the display stack 211 is shown in FIG. 3A. In the example shown in FIG. 2, the display stack 211 is attached to the TFT layer 102 via an adhesive layer 202.

According to this implementation, the TFT layer 102, the array of sensor pixels 206 and the electrode are electrically coupled to at least a portion of the control system 106 and one side of the ultrasonic transceiver layer 101 via a portion of the interface system 107, which includes electrically conducting material and a flexible printed circuit (FPC) in this instance.

In this example, the apparatus 100 is configured to perform at least some of the methods disclosed herein. In this example, the control system 106 is configured to control the ultrasonic sensor system to transmit one or more ultrasonic waves 213. According to this example, the ultrasonic wave(s) 213 are transmitted through the TFT layer 102, the OLED display and the cover glass 218. According to this example, the reflections 214 of the ultrasonic wave(s) 213 include reflections 214b caused by acoustic impedance contrast at (or near) the interface 215 between the outer surface of the cover 218 and the surface of the target object 220, such as the ridges and valleys of a fingerprint, etc. (As used herein, the term "finger" may refer to any digit, including a thumb. Accordingly, a thumbprint will be considered a type of "fingerprint.") In this example, the reflections 214 of the ultrasonic wave(s) 213 include reflections 214a caused by acoustic impedance contrast within target object 220, such as acoustic impedance contrast between sub-epidermal features, e.g., the sub-epidermal features described above with reference to FIG. 1A.

According to this example, the frequency-differentiating layer 103 includes a first frequency-differentiating layer area (here, the frequency-differentiating layer area 203a) corresponding to a lower-frequency area of the ultrasonic sensor system (here, the lower-frequency area 225a). In this implementation, the frequency-differentiating layer area 203a includes a first material having a first acoustic impedance. Here, the first material includes a high-impedance layer. In some implementations, the high-impedance layer may include steel, copper, nickel, cupronickel and/or glass.

According to some implementations, the peak frequency of ultrasonic waves 213 that are transmitted in the lower-frequency area 225a is in the range of 1 MHz to 10 MHz. Such relatively lower-frequency ultrasonic waves 213 are generally more effective for imaging sub-epidermal features than higher-frequency frequency ultrasonic waves 213, such as ultrasonic waves in a range from 10 MHz to 20 MHz.

In this example, the frequency-differentiating layer 103 includes a second frequency-differentiating layer area (here, the frequency-differentiating layer area 203b) corresponding to a higher-frequency area of the ultrasonic sensor system (here, the higher-frequency area 225b). In this implementation, the frequency-differentiating layer area 203b includes a second material having a second acoustic impedance. In this example, the first acoustic impedance is higher than the second acoustic impedance. According to this example, the second material includes a low-impedance layer. In some implementations, the low-impedance layer includes a plastic layer and/or an adhesive layer. According to some examples, the low-impedance layer may include polyimide, polycarbonate and/or polyethylene terephthalate.

According to some implementations, the peak frequency of ultrasonic waves 213 that are transmitted in the higher-frequency area 225b is in a range of 10 MHz to 20 MHz. Such relatively higher-frequency ultrasonic waves 213 are generally more suitable for imaging fingerprint features than lower-frequency frequency ultrasonic waves 213.

In some such examples, the reflections 214 may be detected by the array of sensor pixels 206 and/or the electrode layer 210. Corresponding ultrasonic signals may be provided to the control system 106. In some such implementations, reflections 214 corresponding to a cover/air interface may be detected by the electrode layer 210 and corresponding background ultrasonic signals may be provided to the control system 106. In some such implementations, ultrasonic signals that are used by the control system 106 for fingerprint-based authentication may be based on reflections 214 from a cover/finger interface that are detected by the array of sensor pixels 206.

In some implementations, the control system 106 may be configured to control the ultrasonic transceiver layer to transmit a first ultrasonic wave (e.g., the ultrasonic wave 213 associated with the arrow 213a) through a first frequency-differentiating layer area (e.g., the frequency-differentiating layer area 203a). The first ultrasonic wave may include a first peak frequency, which may be a peak frequency of a lower-frequency area (e.g., the lower-frequency area 225a) of the ultrasonic sensor system 105. According to some such examples, the peak frequency of the lower-frequency area may be in the range of 1 MHz to 10 MHz.

In some examples, the control system 106 may be configured to control the ultrasonic transceiver layer to transmit a second ultrasonic wave (e.g., the ultrasonic wave 213 associated with the arrow 213b) through a second frequency-differentiating layer area (e.g., the frequency-differentiating layer area 203b). The second ultrasonic wave may include a second peak frequency, which may be a peak frequency of a higher-frequency area (e.g., the higher-frequency area 225b) of the ultrasonic sensor system 105. According to some such examples, the peak frequency of the lower-frequency area may be in the range of 10 MHz to 20 MHz.

In some implementations, the control system 106 may be configured to receive, from the ultrasonic transceiver layer, first signals corresponding to reflections of the first ultrasonic wave from a first portion of a target object (e.g., reflections 214a caused by acoustic impedance contrast within target object 220) positioned on an outer surface (e.g., the outer surface 215) of the apparatus. In some implementations, the control system 106 may be configured to receive, from the ultrasonic transceiver layer, second signals corresponding to reflections of the second ultrasonic wave from a second portion of the target object (e.g., reflections 214b caused by acoustic impedance contrast at (or near) the interface 215 between the outer surface of the cover 218 and the surface of the target object 220, such as the ridges and valleys of a fingerprint). In some examples, the control system 106 may be configured to perform an authentication process that is based, at least in part, on the first signals, the second signals or combinations thereof.

According to some examples, the control system 106 may be configured to obtain fingerprint data based on portions of the second signals received within a time interval corresponding with fingerprints. The time interval may, for example, be measured relative to a time at which the second ultrasonic wave is transmitted. Obtaining the fingerprint data may, for example, involve extracting, via a control system, second target object features from the second signals. The second target object features may, for example, include fingerprint features. According to some examples, the fingerprint features may include fingerprint minutiae, keypoints and/or sweat pores. In some examples, the fingerprint features may include ridge ending information, ridge bifurcation information, short ridge information, ridge flow information, island information, spur information, delta information, core information, etc.

In some examples, the control system 106 may be configured to perform an authentication process that is based, at least in part, on the second signals. In some such examples, the control system 106 may be configured to perform an authentication process that is based, at least in part, on the fingerprint features. According to some examples, the control system 106 may be configured to compare the fingerprint features with fingerprint features of an authorized user. The fingerprint features of the authorized user may, for example, have been received during a previous enrollment process.

According to some examples, the first signals may include sub-epidermal layer information corresponding to reflections of the first ultrasonic wave received from the first portion of the target object within a time interval corresponding to a sub-epidermal region. In some implementations, the control system 106 may be configured to extract sub-epidermal features from the first signals. Sub-epidermal features of the authorized user may, for example, have been received during a previous enrollment process. According to some implementations, the authentication process may involve comparing sub-epidermal features extracted from the first signals with sub-epidermal features of the authorized user.

In some such implementations, the sub-epidermal features may include sub-epidermal layer information corresponding to reflections of the first ultrasonic wave received from the portion of the target object within a time interval corresponding with a sub-epidermal region. The sub-epidermal features may, for example, include dermis layer information corresponding to reflections of the first ultrasonic wave received from the portion of the target object 207. The dermis layer information may have been obtained within a time interval corresponding with a dermis layer. The authentication process may be based, at least in part, on the dermis layer information.

Alternatively, or additionally, the sub-epidermal features may include information regarding other sub-epidermal layers, such as the papillary layer, the reticular layer, the subcutis, etc., and any blood vessels, lymph vessels, sweat glands, hair follicles, hair papilla, fat lobules, etc., that may be present within such tissue layers. Some examples are described above with reference to FIG. 1A. However, the sub-epidermal features may include information regarding sub-epidermal features that are not shown in FIG. 1A, such as muscle tissue, bone material, etc. In some such examples, the control system 106 may be configured to perform a liveness detection process that is based, at least in part, on the first signals.

In some examples, the control system 106 may be configured for controlling access to the apparatus 100, or to another device, based at least in part on the authentication process. For example, in some implementations a mobile device (such as a cell phone) may include the apparatus 100. In some such examples, the control system 106 may be configured for controlling access to the mobile device based, at least in part, on the authentication process.

In some implementations an Internet of things (IoT) device may include the apparatus 100. For example, in some such implementations a device intended for use in a home, such as a remote control device (such as a remote control device for a smart television), a stove, an oven, a refrigerator, a stove, a coffee maker, an alarm system, a door lock, a mail/parcel box lock, a thermostat, etc., may include the apparatus 100. In some such examples, the control system may be configured for controlling access to the IoT device based, at least in part, on the authentication process.

In alternative implementations, an automobile (including but not limited to a partially or fully autonomous automobile), a partially or fully autonomous delivery vehicle, a drone, or another device typically used outside of the home may include the apparatus 100. In some such examples, the control system may be configured for controlling access to the vehicle, the drone, etc., based at least in part on the authentication process.

In some examples, including but not limited to many IoT implementations, there may be a metal, plastic, ceramic or polymer layer between an outer surface of the apparatus 100, or an outer surface of a device that includes the apparatus 100. In such implementations, the acoustic waves transmitted towards, and reflected from, a finger or other target may need to pass through the metal, plastic, ceramic or polymer layer. Ultrasound and other acoustic waves can be successfully transmitted through e.g., a metal layer, whereas some other types of waves (e.g., light waves) cannot. Similarly, ultrasound and other acoustic waves can be successfully transmitted through an optically opaque plastic, ceramic or polymer layer, whereas some other types of waves, such as light waves, cannot. This feature is another potential advantage of some disclosed implementations, as compared to devices that rely upon optical or capacitive fingerprint sensors.

FIG. 3A shows examples of a display stack and an ultrasonic sensor stack in a lower-frequency area of an ultrasonic sensor system. As with other disclosed implementations, the types, number and arrangement of elements shown in FIG. 3A are merely examples. Other implementations may include different types, numbers and/or arrangements of elements. In some alternative examples, the entire area of an ultrasonic sensor system may include the layers shown in FIG. 3A.

Here, the apparatus 100 is an instance of the apparatus 100 shown in FIG. 1B. According to this example, the apparatus 100 includes an ultrasonic sensor stack 305 and an instance of the display stack 211 of FIG. 2. Here the ultrasonic sensor stack 305 is attached to the display stack 211 via an adhesive layer 301.

According to this example, the ultrasonic sensor stack 305 includes a TFT layer 102, an ultrasonic transceiver layer 102 and an electrode layer 210. According to some implementations, the TFT layer 102 may be in the range of 50 microns to 150 microns, e.g., 50 microns, 55 microns, 60 microns, 65 microns, 70 microns, 75 microns, 80 microns, 85 microns, 90 microns, 95 microns, 100 microns, 105 microns, 110 microns, 115 microns, 120 microns, 125 microns, 130 microns, 135 microns, 140 microns, 145 microns or 150 microns.

According to some examples, the ultrasonic transceiver layer 101 may be, or may include, one or more piezoelectric materials, such as a piezoelectric polymer and/or a piezoelectric copolymer. In some examples, the ultrasonic transceiver layer 102 may be in the range of 5 microns to 20 microns, e.g., 5 microns, 6 microns, 7 microns, 8 microns, 9 microns, 10 microns, 11 microns, 12 microns, 13 microns, 14 microns, 15 microns, 16 microns, 17 microns, 18 microns, 19 microns or 20 microns.

According to some implementations, the electrode layer 210 may be, or may include, a conductive ink (e.g., silver ink). In some examples, the electrode layer 210 may be in the range of 10 microns to 30 microns, e.g., 10 microns, 11 microns, 12 microns, 13 microns, 14 microns, 15 microns, 16 microns, 17 microns, 18 microns, 19 microns, 20 microns, 21 microns, 22 microns, 23 microns, 24 microns, 25 microns, 26 microns, 27 microns, 28 microns, 29 microns or 30 microns.

In this instance, the ultrasonic sensor stack 305 includes a passivation layer 212 and an adhesive layer 302a. According to this example, the passivation layer 212 includes an epoxy film. In some examples, the passivation layer 212 may be in the range of 10 microns to 30 microns, e.g., 10 microns, 11 microns, 12 microns, 13 microns, 14 microns, 15 microns, 16 microns, 17 microns, 18 microns, 19 microns, 20 microns, 21 microns, 22 microns, 23 microns, 24 microns, 25 microns, 26 microns, 27 microns, 28 microns, 29 microns or 30 microns. In some examples, the adhesive layer 302a may include a thin pressure-sensitive adhesive (PSA). In some instances, the adhesive layer 302a may be in the range of 2 microns to 10 microns.

In this instance, the ultrasonic sensor stack 305 includes a frequency-differentiating layer 103 that resides between the TFT layer 102 and the display stack 211. According to this example, the TFT layer 102 resides between the ultrasonic transceiver layer 102 and the frequency-differentiating layer 103. In this example, the frequency-differentiating layer 103 includes a layer of high-impedance material, which also may be referred to herein as a high-impedance layer. According to some implementations, the high-impedance layer may include a metal (e.g., steel, nickel, cupronickel or copper) and/or glass. In some examples, the high-impedance layer may be in the range of 20 microns to 50 microns, e.g., 20 microns, 25 microns, 30 microns, 35 microns, 40 microns, 45 microns or 50 microns.

According to this example, the ultrasonic sensor stack 305 includes a resonator 310a in the lower-frequency area 225a of the ultrasonic sensor stack 305. In this implementation, the high-impedance material of the frequency-differentiating layer 103 is on one side of the resonator 310a. Here, the resonator 310a corresponds to a quarter wavelength at a peak frequency of the lower-frequency area 225a. According to some implementations, the peak frequency of the lower-frequency area 225a may be in the range of 1 MHz to 10 MHz, e.g., 1 MHz, 2 MHz, 3 MHz, 4 MHz, 5 MHz, 6 MHz, 7 MHz, 8 MHz, 9 MHz or 10 MHz. In this example, the resonator 310a includes the adhesive layer 302a, the TFT layer 102, the ultrasonic transceiver layer 101, the electrode layer 210 and the passivation layer 212.

In this example, the display stack 211 includes one or more screen protector layers 311, a glass layer 303, a polarizer layer 312, an OLED panel 314 and one or more layers of protective film 315. According to this implementation, an optically clear adhesive (OCA) layer 304a connects the one or more screen protector layers 311 to the glass layer 303 and an OCA layer 304b connects the glass layer 303 to the polarizer layer 312. In this implementation, a polarizer pressure-sensitive adhesive 313a connects the polarizer 312 to the OLED panel 314 and a pressure-sensitive adhesive 313b connects the OLED panel 314 to the one or more layers of protective film 315. The polarizer pressure-sensitive adhesive 313a may, for example, be an optically clear adhesive (OCA).

According to this example, the display stack 211 includes resonator 310c, which is formed by the one or more screen protector layers 311 and the OCA 304a, and is bounded by the glass layer 303: here, the glass layer 303 has a higher index of refraction than that of the one or more screen protector layers 311 or the OCA 304a. In this example, the resonator 310c corresponds to a quarter wavelength at a peak frequency of the lower-frequency area 225a, or an odd multiple of the quarter wavelength. As noted above, in some implementations the peak frequency of the lower-frequency area 225a may be in the range of 1 MHz to 10 MHz. In some alternative implementations, the resonator 310c corresponds to a quarter wavelength at a peak frequency of the entire ultrasonic sensor area. According to some such implementations, a frequency range that includes the peak frequency of the resonator 310a may correspond with a frequency range that includes the peak frequency of the resonator 310c.

In this example, the adhesive layer 301 and layers of the display stack 211 form the resonator 310b, which is bounded by the glass layer 303 and the high-impedance layer 103. According to this example, the resonator 310b includes the OCA layer 304b, the polarizer layer 312, the polarizer pressure-sensitive adhesive 313a, the OLED panel 314, the pressure-sensitive adhesive 313b, the one or more layers of protective film 315 and the adhesive layer 301. In this example, the resonator 310b corresponds to a multiple N of a half wavelength at a peak frequency of the lower-frequency area 225a, where N is an integer greater than or equal to 1. In some alternative implementations, the resonator 310b corresponds to a quarter wavelength at a peak frequency of the entire ultrasonic sensor area. According to some such implementations, a frequency range that includes the peak frequency of the resonator 310a may correspond with a frequency range that includes the peak frequency of the resonator 310b and/or a frequency range that includes the peak frequency of the resonator 310c.

Figure 3B:
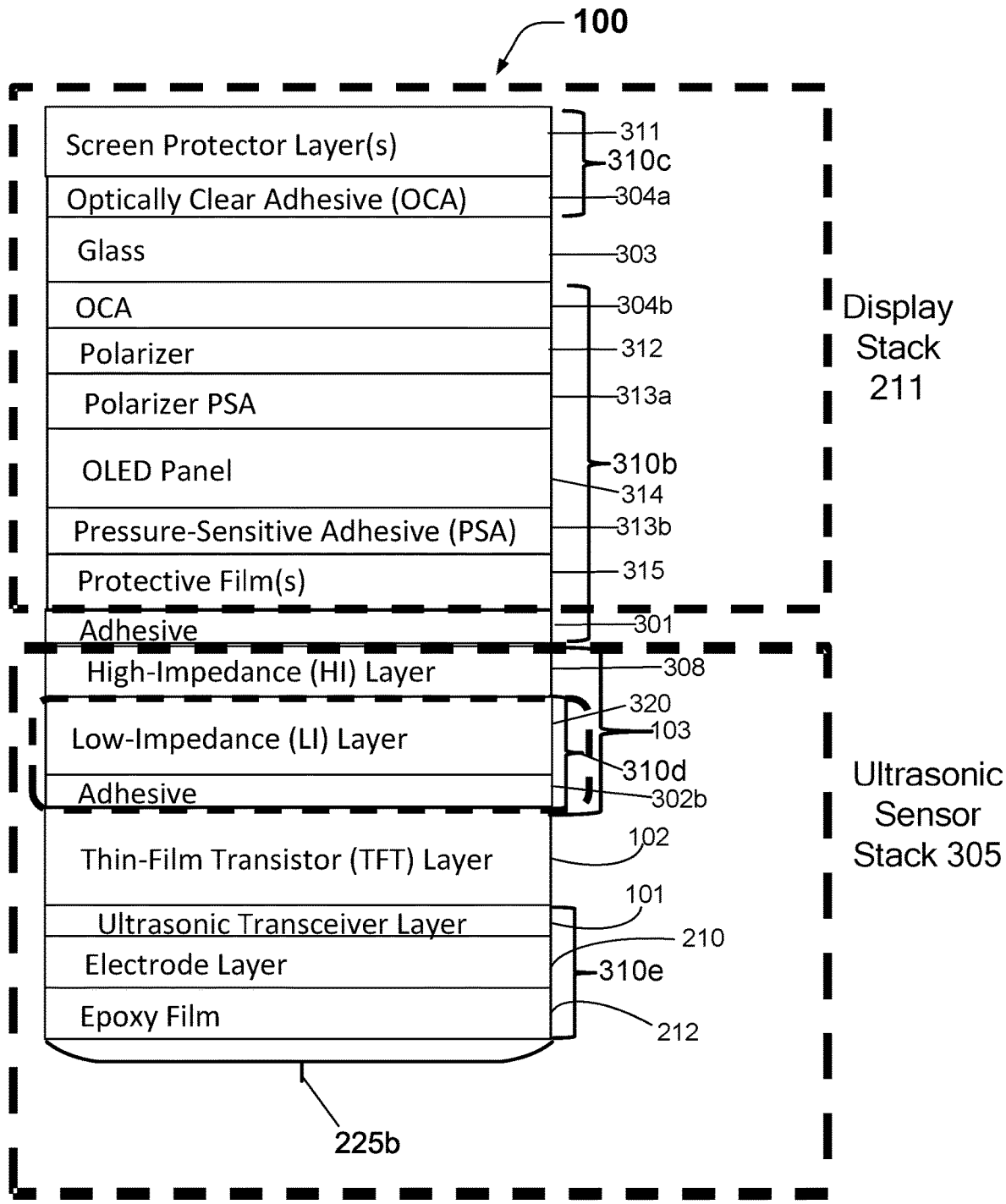
FIG. 3B shows examples of a display stack and an ultrasonic sensor stack in a higher-frequency area of an ultrasonic sensor system.

FIG. 3B shows examples of a display stack and an ultrasonic sensor stack in a higher-frequency area of an ultrasonic sensor system. As with other disclosed implementations, the types, number and arrangement of elements shown in FIG. 3B are merely examples. Other implementations may include different types, numbers and/or arrangements of elements. In some alternative examples, the entire area of an ultrasonic sensor system may include the layers shown in FIG. 3B.

In this example, the apparatus 100 is an instance of the apparatus 100 shown in FIG. 1B. According to this example, the apparatus 100 includes an ultrasonic sensor stack 305 and an instance of the display stack 211 of FIG. 2. Here, the ultrasonic sensor stack 305 is attached to the display stack 211 via an adhesive layer 301. In this instance, as in FIGS. 2 and 3A, the ultrasonic sensor stack 305 includes a frequency-differentiating layer 103 that resides between the TFT layer 102 and the display stack 211.

According to this example, the ultrasonic sensor stack 305 and the display stack 211 of the higher-frequency area 225b of the ultrasonic sensor stack 305 include all of the layers of the ultrasonic sensor stack 305 and the display stack 211 in the lower-frequency area 225a that are described above with reference to FIG. 3A. The descriptions of these layers will not be repeated here, except as noted in these paragraphs. For example, the adhesive layer 302b of FIG. 3B includes the same material as the adhesive layer 302a of FIG. 3A, except that in this example the adhesive layer 302b is thicker than the adhesive layer 302a: here, for example, the adhesive layer 302b may be in the range of 10-20 microns. In this example, the adhesive layer 302b has a lower impedance than that of the HI layer 103, e.g., in the range of 2-4 MRayls.

Moreover, in this example frequency-differentiating layer 103 of the ultrasonic sensor stack 305 in the higher-frequency area 225b also includes a low-impedance (LI) layer 320. According to some implementations, the LI layer 320 may include one or more types of plastic, such as polyimide, polycarbonate or polyethylene terephthalate.

In this example, the frequency-differentiating layer 103 of the higher-frequency area 225b includes a resonator 310d. According to this implementation, the resonator 310d includes the adhesive layer 302b and the LI layer 320. Here, the resonator 310d is bounded by the HI layer 103 and the TFT layer 102. According to this example, the resonator 310d has a thickness that corresponds to a multiple N of a half wavelength at a peak frequency of the higher-frequency area 225b, where N is an integer greater than or equal to 1. According to some implementations, the peak frequency of the higher-frequency area 225b may be in the range of 10 MHz to 20 MHz, e.g., 10 MHz, 11 MHz, 12 MHz, 13 MHz, 14 MHz, 15 MHz, 16 MHz, 17 MHz, 18 MHz, 19 MHz or 20 MHz.

In this example, the frequency-differentiating layer 103 of the higher-frequency area 225b also includes a resonator 310e. According to this implementation, the resonator 310e includes the ultrasonic transceiver layer 101, the electrode layer 210 and the passivation layer 212. Here, the resonator 310e is bounded by the TFT layer 102. According to this example, the resonator 310e has a thickness that corresponds to a quarter wavelength corresponding to a peak frequency of the higher-frequency area 225b, or an odd multiple thereof.

According to this example, as in FIG. 3A, the display stack 211 includes resonator 310c, which is formed by the one or more screen protector layers 311 and the OCA 304a and is bounded by the glass layer 303. However, in this example, the resonator 310c corresponds to a quarter wavelength of a peak frequency of the higher-frequency area 225b, or an odd multiple thereof. In some alternative implementations, the resonator 310c corresponds to a quarter wavelength at a peak frequency of the entire ultrasonic sensor area. According to some such implementations, a frequency range that includes the peak frequency of the resonator 310d and/or the resonator 310e may correspond with a frequency range that includes the peak frequency of the resonator 310c.

In this example, as in the example described above with reference to FIG. 3A, the adhesive layer 301 and layers of the display stack 211 form the resonator 310b, which is bounded by the glass layer 303 and the high-impedance layer 103. According to this example, the resonator 310b includes the OCA layer 304b, the polarizer layer 312, the polarizer pressure-sensitive adhesive 313a, connects the OLED panel 314, the pressure-sensitive adhesive 313b, the one or more layers of protective film 315 and the adhesive layer 301. However, in this example, the resonator 310b corresponds to a multiple N of a half wavelength of a peak frequency at the higher-frequency area 225b, where N is an integer of 1 or more. In some alternative implementations, the resonator 310c corresponds to a quarter wavelength at a peak frequency of the entire ultrasonic sensor area. According to some such implementations, a frequency range that includes the peak frequency of the resonator 310d and/or the resonator 310e may correspond with a frequency range that includes the peak frequency of the resonator 310b and/or a frequency range that includes the peak frequency of the resonator 310c.

Figure 4:
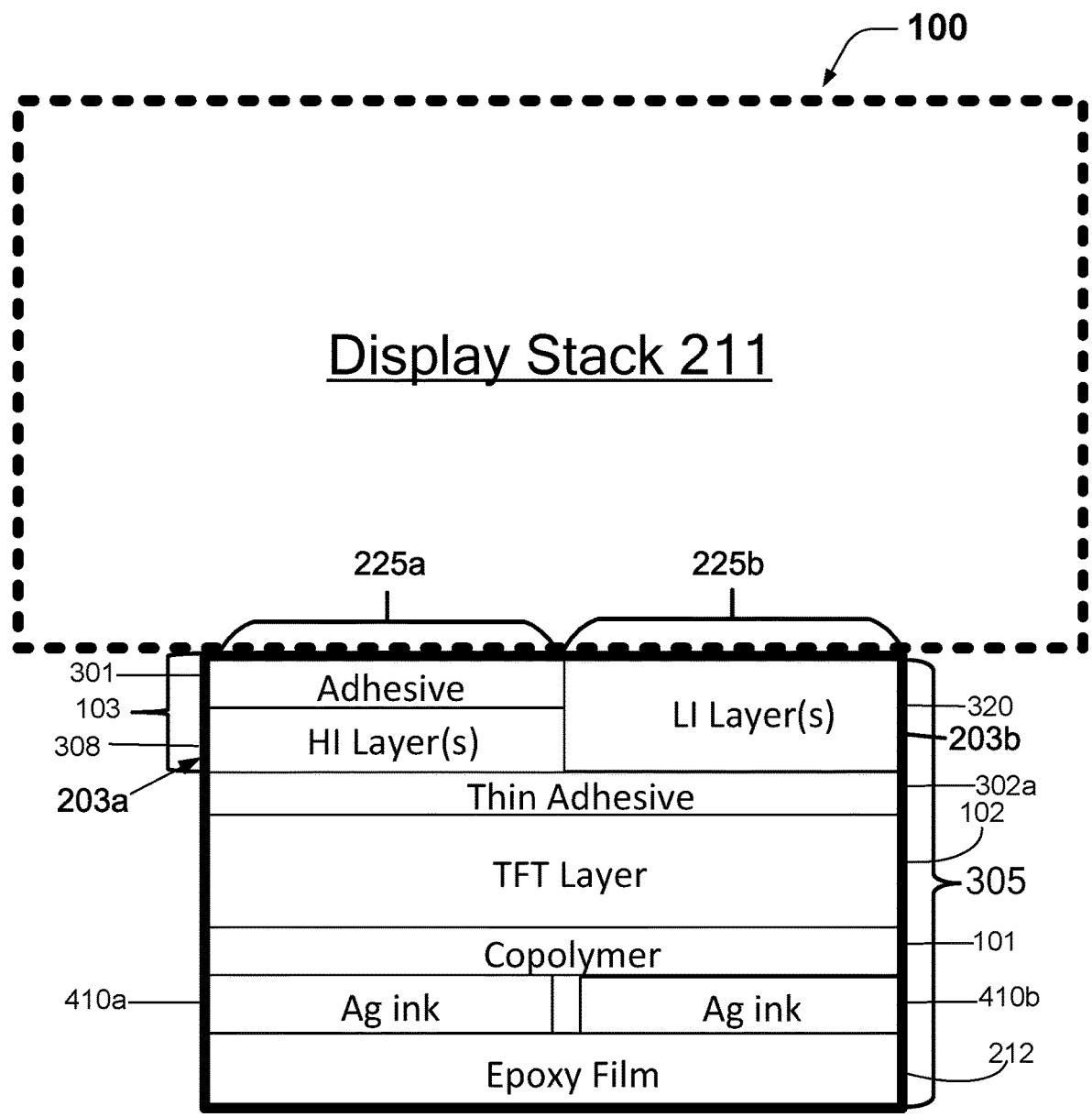
FIG. 4 shows examples of a display stack and ultrasonic sensor stacks corresponding to higher-frequency and lower-frequency areas of an ultrasonic sensor system.

FIG. 4 shows examples of a display stack and ultrasonic sensor stacks corresponding to higher-frequency and lower-frequency areas of an ultrasonic sensor system. As with other disclosed implementations, the types, number and arrangement of elements shown in FIG. 4 are merely examples. Other implementations may include different types, numbers and/or arrangements of elements.

In this example, the apparatus 100 is an instance of the apparatus 100 shown in FIG. 1B. According to this example, the apparatus 100 includes an ultrasonic sensor stack 305 and an instance of the display stack 211 of FIG. 2. Here, the ultrasonic sensor stack 305 is attached to the display stack 211 via an adhesive layer 301. According to some examples, the portion of the adhesive layer 301 that resides between the one or more low-impedance layers 320 and the display stack 211 is thinner than the portion of the adhesive layer 301 that resides between the HI layer 308 and the display stack 211. In some examples, the one or more low-impedance layers 320 include an adhesive layer adjacent to the display stack 211.

In some examples, the display stack 211 includes the layers of the display stacks 211 that are described above. The descriptions of these layers will not be repeated here. However, the display stack 211 may or may not include resonators as described above, depending on the particular implementation.

In this instance, as in FIGS. 2, 3A and 3B, the ultrasonic sensor stack 305 includes a frequency-differentiating layer 103 that resides between the TFT layer 102 and the display stack 211. In this example, the frequency-differentiating layer area 203a corresponds to the lower-frequency area 225a and the frequency-differentiating layer area 203b corresponds to the higher-frequency area 225b. In this implementation, the frequency-differentiating layer area 203a includes one or more high-impedance layers 308. In some implementations, the high-impedance layer(s) may include steel, nickel, cupronickel, copper and/or glass. In this implementation, the frequency-differentiating layer area 203b includes one or more low-impedance layers 320. In this example, the acoustic impedance of the high-impedance layer(s) 308 is higher than that of the one or more low-impedance layers 320. In some implementations, the one or more low-impedance layers 320 may include one or more plastic layers and/or one or more adhesive layers. According to some examples, the one or more plastic layers may include polyimide, polycarbonate and/or polyethylene terephthalate.

In some implementations, the ultrasonic sensor stack 305 may include one or more resonators, such as the resonator 310a that is described above with reference to FIG. 3A, in the lower-frequency area 225a. In some examples, the ultrasonic sensor stack 305 may include one or more resonators, such as the resonator 310d and/or a resonator 310e that are described above with reference to FIG. 3B, in the higher-frequency area 225b.

According to this example, the ultrasonic sensor stack 305 includes separate instances of the electrode layer 210 in the lower-frequency area 225a and the higher-frequency area 225b: in this implementation, the electrode layer 210 includes an electrode layer segment 410a in the lower-frequency area 225a and an electrode layer segment 410b in the higher-frequency area 225b. In this instance, the electrode layer segments 410a and 410b include conductive ink, which includes silver ink in this particular example. Having separate electrode layer segments 410a and 410b allows the lower-frequency area 225a and the higher-frequency area 225b of the ultrasonic sensor stack 305 to be separately addressable by a control system (not shown in FIG. 4).

In this example, the ultrasonic transceiver layer 101 is continuous across the lower-frequency area 225a and the higher-frequency area 225b. Here, the ultrasonic transceiver layer 101 includes a piezoelectric copolymer. In alternative implementations, the ultrasonic transceiver layer 101 may not be continuous across the lower-frequency area 225a and the higher-frequency area 225b, but instead may be segmented, e.g., like the electrode layer segments 410a and 410b of the electrode layer 210.

FIGS. 5A, 5B, 5C and 5D show additional examples of a display stack and ultrasonic sensor stacks corresponding to higher-frequency and lower-frequency areas of an ultrasonic sensor system. As with other disclosed implementations, the types, number and arrangements of elements shown in FIGS. 5A, 5B, 5C and 5D are merely examples. Other implementations may include different types, numbers and/or arrangements of elements.

In these examples, the apparatus 100 is an instance of the apparatus 100 shown in FIG. 1B. According to these examples, the apparatus 100 includes an ultrasonic sensor stack 305 and an instance of the display stack 211 of FIG. 2. In these examples, the ultrasonic sensor stack 305 is attached to the display stack 211 via an adhesive layer 301. In some examples, the display stack 211 includes the layers of the display stacks 211 that are described above. The descriptions of these layers will not be repeated here. In some implementations, the ultrasonic sensor stack 305 may include one or more resonators, such as the resonator 310a that is described above with reference to FIG. 3A, in the lower-frequency area 225a. In some examples, the ultrasonic sensor stack 305 may include one or more resonators, such as the resonator 310d and/or a resonator 310e that are described above with reference to FIG. 3B, in the higher-frequency area 225b. However, the display stack 211 may or may not include resonators as described above, depending on the particular implementation.

Figure 5A:
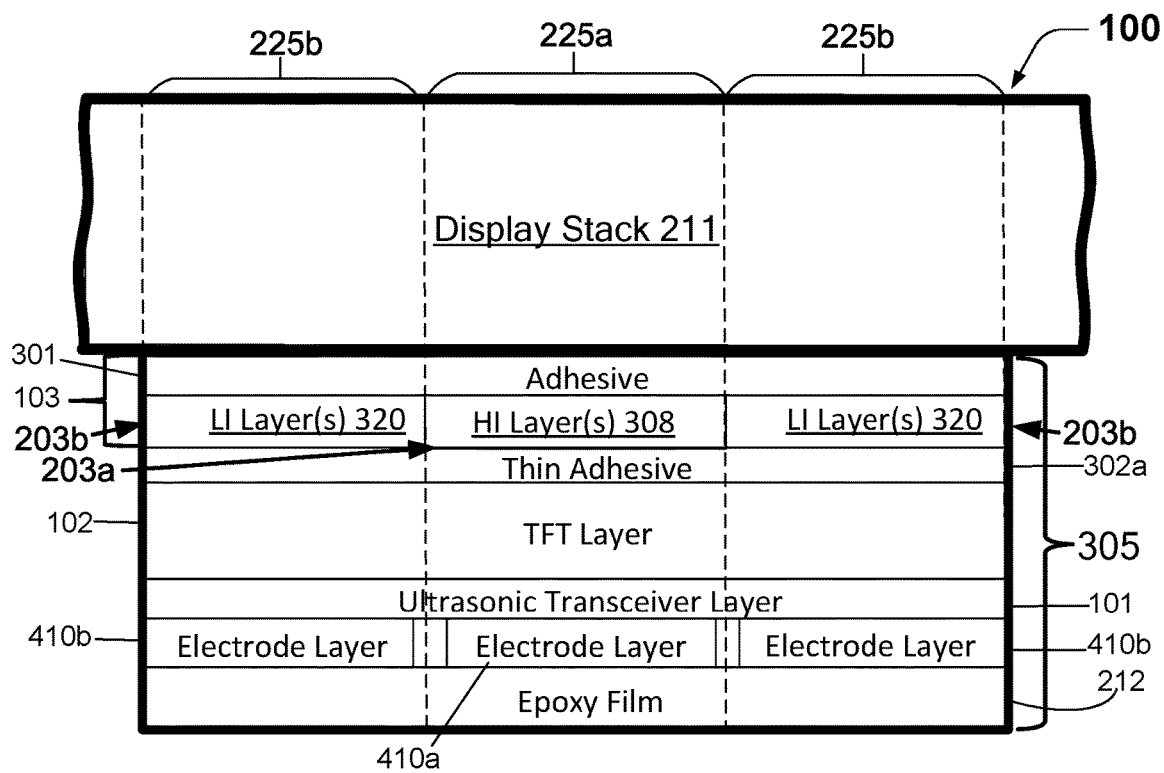
FIGS. 5A, 5B, 5C and 5D show additional examples of a display stack and ultrasonic sensor stacks corresponding to higher-frequency and lower-frequency areas of an ultrasonic sensor system.
Figure 5B:
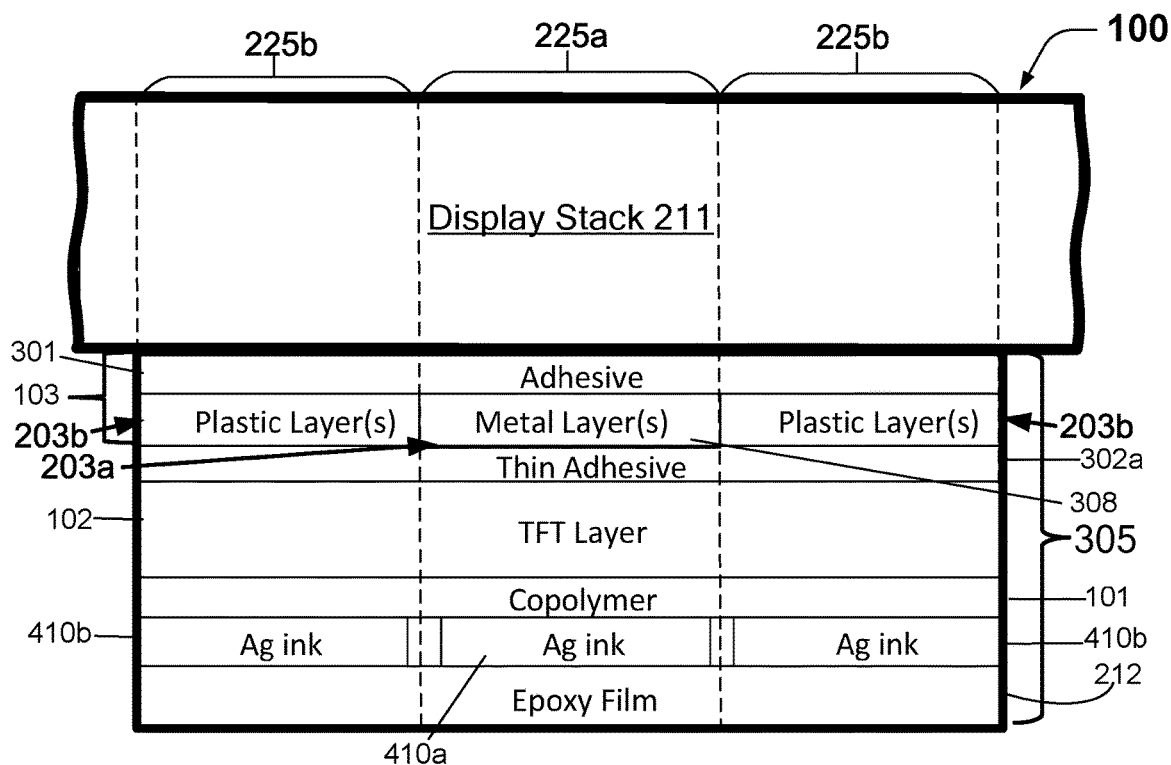
Figure 5C:
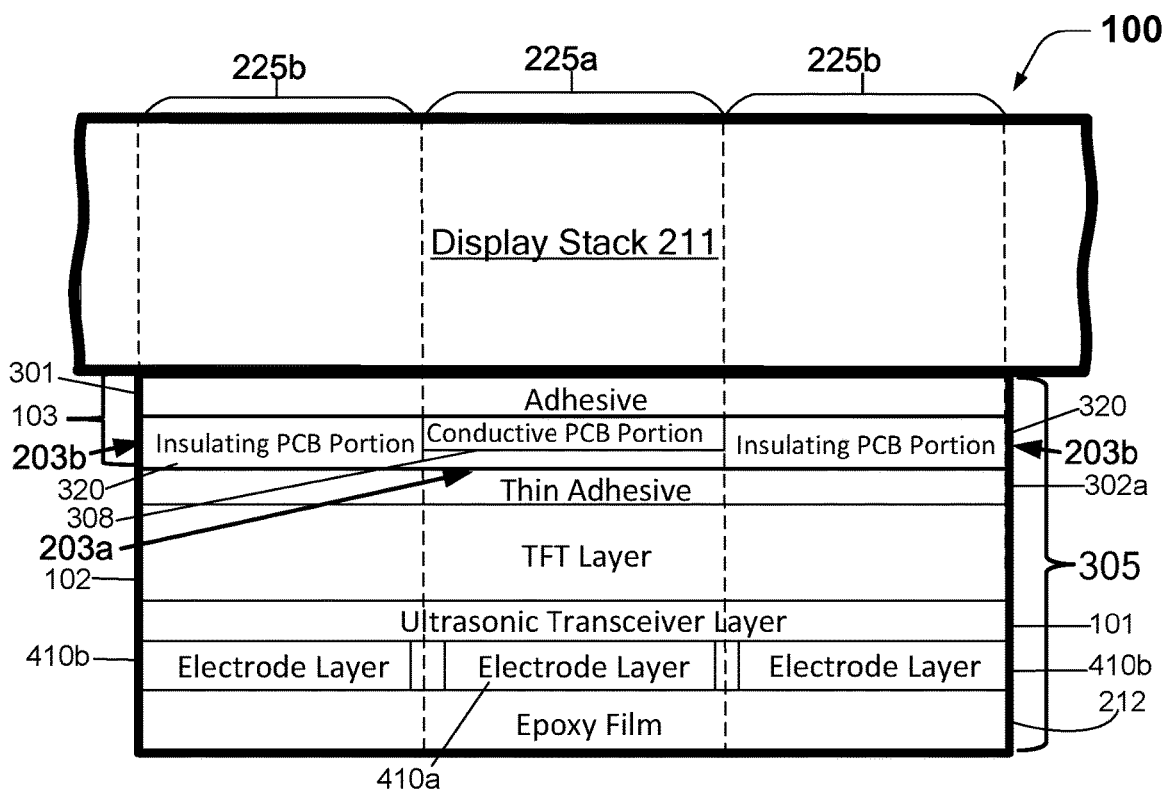

In the examples shown in FIGS. 5A-5C, the ultrasonic sensor stack 305 includes a frequency-differentiating layer 103 that resides between the TFT layer 102 and the display stack 211. However, in the example shown in FIG. 5D, the TFT layer 102 resides between the frequency-differentiating layer 103 and the display stack 211.

In the examples shown in FIGS. 5A-5D, the frequency-differentiating layer areas 203a correspond to the lower-frequency areas 225a and the frequency-differentiating layer areas 203b correspond to the higher-frequency areas 225b. The examples shown in FIGS. 5A-5D are cross-sections that correspond with the cross-section line A, A', shown in FIG. 5E, through the lower-frequency area 225a and the higher-frequency area 225b.

In the implementations shown in FIGS. 5A-5D, the frequency-differentiating layer areas 203a include at least one high-impedance layer 308. In these examples, the frequency-differentiating layer areas 203b include at least one low-impedance layer 320.

In the implementation shown in FIG. 5B, the high-impedance layer(s) 308 include one or more metal layers. The metal layer(s) may, for example, include steel (e.g., stainless steel), nickel, cupronickel or copper. In the example shown in FIG. 5B, the frequency-differentiating layer areas 203b include at least one plastic layer. According to some examples, the one or more plastic layers may include polyimide, polycarbonate and/or polyethylene terephthalate.

In the example shown in FIG. 5C, the high-impedance layer 308 of the frequency-differentiating layer area 203a includes one or more conductive layers (e.g., one or more nickel, cupronickel and/or copper layers) of printed circuit board (PCB). In this example, the frequency-differentiating layer areas 203b include one or more insulating layers (e.g., one or more polyimide layers) of the printed circuit board.

According to the examples shown in FIGS. 5A-5D, the ultrasonic sensor stacks 305 include separate instances of the electrode layer 210 in the lower-frequency area 225a and the higher-frequency area 225b: in these implementations, the electrode layer 210 includes electrode layer segments 410a in the lower-frequency areas 225a and electrode layer segments 410b in the higher-frequency areas 225b. Having separate electrode layer segments 410a and 410b allows the lower-frequency areas 225a and the higher-frequency areas 225b to be separately addressable by a control system (not shown in FIGS. 5A-5D).

In the example shown in FIG. 5B, the electrode layer segments 410a and 410b include conductive ink, which includes silver ink in this particular example. According to the example shown in FIG. 5C, the electrode layer segments 410a and 410b include conductive portions of printed circuit board.

Figure 5D:
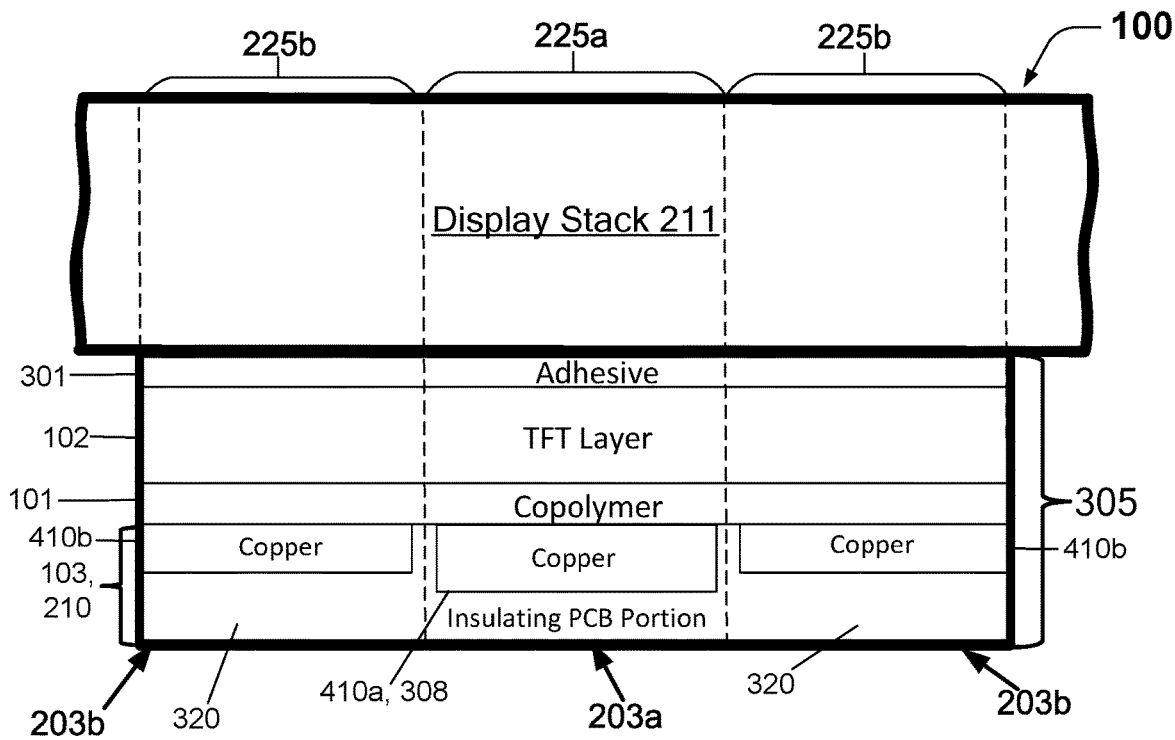

According to the example shown in FIG. 5D, the electrode layer segments 410a and 410b include one or more conductive layers of printed circuit board, which include one or more copper layers in this instance. In some alternative examples, the conductive layers may include nickel and/or cupronickel. In this example, the electrode layer segment 410a corresponds to the high-impedance layer(s) 308 of the frequency-differentiating layer area 203a. According to this example, the electrode layer segment 410a of the frequency-differentiating layer area 203a is relatively thicker than the electrode layer segments 410b of the frequency-differentiating layer areas 203b. In some examples, the electrode layer segments 410b may be in the range of 30-70 microns. In this example, the insulating printed circuit board portion in the frequency-differentiating layer areas 203b is relatively thicker than the insulating printed circuit board portion in the frequency-differentiating layer area 203a. In some examples, the insulating printed circuit board portions may have thicknesses in the range of 100-500 microns. In some examples, the insulating printed circuit board portions may, for example, include one or more polyimide layers of the printed circuit board.

Implementations such as that shown in FIG. 5D are potentially advantageous because the frequency-differentiating layer 103 corresponds to the electrode layer 210. Accordingly, there is no need to fabricate a separate frequency-differentiating layer 103 and a separate electrode layer 210. Such implementations may provide both a relatively simpler and faster manufacturing process, thereby providing both potentially greater efficiency and potential cost savings. Moreover, such implementations may provide material savings and therefore potentially increased cost savings.

In some alternative implementations wherein the frequency-differentiating layer 103 corresponds to the electrode layer 210, another type of high-impedance layer, such as a glass layer, may replace the TFT layer 102 shown in FIG. 5D. Substituting one or more plain glass layers (or one or more other high-impedance layers) for the TFT layer 102 shown in the ultrasonic sensor stack 305 of FIG. 5D could potentially provide further cost savings.

In the examples shown in FIGS. 5A-5D, the ultrasonic transceiver layer 101 is continuous across the lower-frequency areas 225a and the higher-frequency areas 225b. In the examples shown in FIGS. 5B and 5D, the ultrasonic transceiver layer 101 includes a piezoelectric copolymer. In alternative implementations, the ultrasonic transceiver layer 101 may not be continuous across the lower-frequency areas 225a and the higher-frequency areas 225b, but instead may be segmented, e.g., like the electrode layer segments 410a and 410b of the electrode layer 210.

Figure 5E:
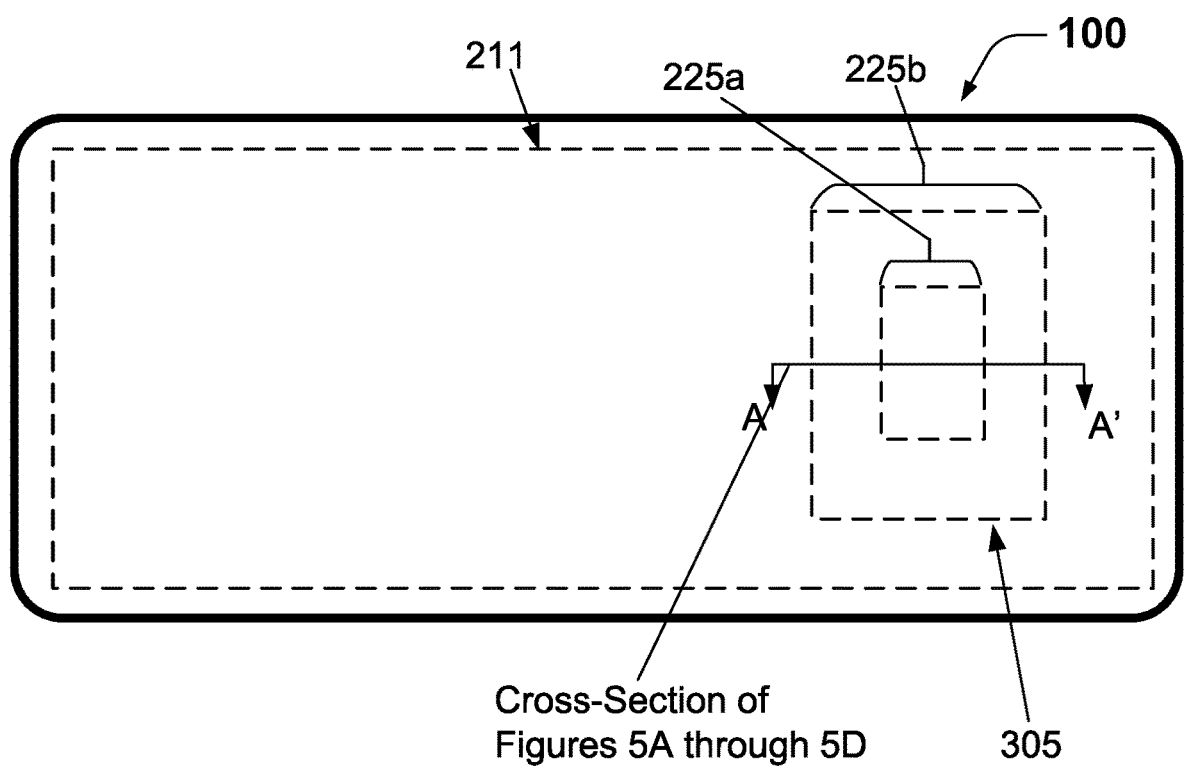
FIG. 5E shows an example of a mobile device implementation.

FIG. 5E shows an example of a mobile device implementation. As with other disclosed implementations, the types, number and arrangement of elements shown in FIG. 5E are merely examples. Other implementations may include different types, numbers and/or arrangements of elements.

In this example, the apparatus 100 is an instance of the apparatus 100 shown in FIG. 1B. According to this example, the apparatus 100 includes an ultrasonic sensor stack 305 and a display stack 211. In this example, the apparatus 100 includes an arrangement of the lower-frequency area 225a and the higher-frequency area 225b like that shown in FIGS. 5A-5D. Various implementations of the example shown in FIG. 5E may include an ultrasonic sensor stack 305 and a display stack 211 corresponding to those shown in any one of FIGS. 5A-5D. In alternative examples, the ultrasonic sensor stack 305 and the display stack 211 may correspond to any of the other display stacks 211 and/or ultrasonic sensor stacks 305 disclosed herein, or equivalents thereof.

In this example, the apparatus 100 includes an instance of the control system 106 that is shown in FIG. 1B and described above, although the control system 106 is not shown in FIG. 5E. Accordingly, the apparatus 100 may be configured to perform at least some (and, in some instances all) of the methods disclosed herein. In some implementations, the apparatus 100 of FIG. 5B may be a cellular telephone.

Figure 6:
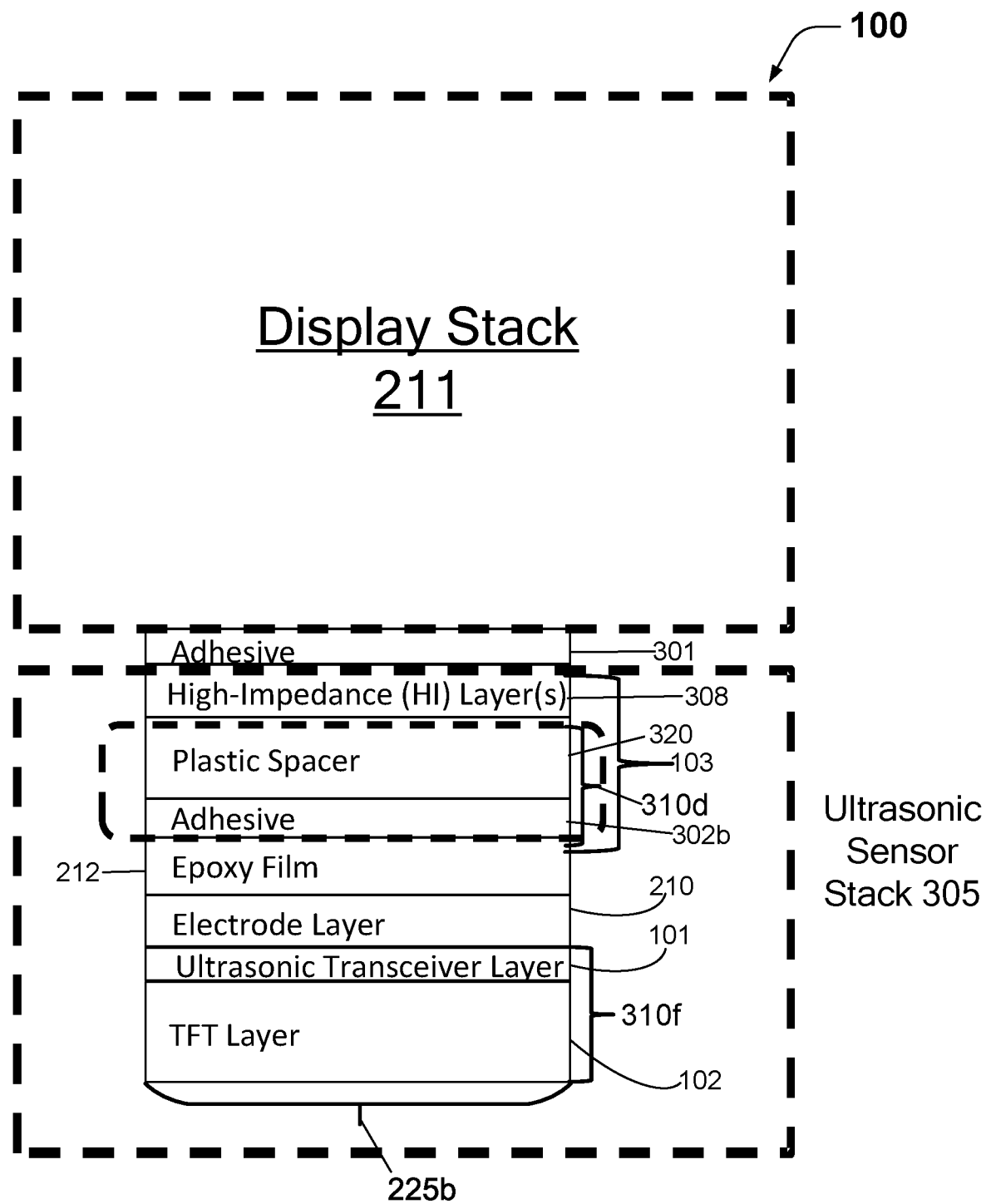
FIG. 6 shows an alternative example of an ultrasonic sensor stack in a higher-frequency area of an ultrasonic sensor system.

FIG. 6 shows an alternative example of an ultrasonic sensor stack in a higher-frequency area of an ultrasonic sensor system. As with other disclosed implementations, the types, number and arrangement of elements shown in FIG. 6 are merely examples. Other implementations may include different types, numbers and/or arrangements of elements.

In this example, the apparatus 100 is an instance of the apparatus 100 shown in FIG. 1B. According to this example, the apparatus 100 includes an ultrasonic sensor stack 305 and a display stack 211. Here, the ultrasonic sensor stack 305 is attached to the display stack 211 via an adhesive layer 301. In this instance, as in some other disclosed implementations (e.g., those shown in FIGS. 2-5C), the ultrasonic sensor stack 305 includes a frequency-differentiating layer 103 that resides between the TFT layer 102 and the display stack 211. According to this example, the frequency-differentiating layer 103 includes an instance of the resonator 310d that is described above with reference to FIG. 3B.

However, according to this example, the electrode layer 210, TFT layer 102 and the ultrasonic receiver layer 101 have a different configuration than those shown in FIGS. 2-5C. In this implementation, the electrode layer 210 resides between the ultrasonic transceiver layer 101 and the frequency-differentiating layer 103. In this example, the electrode layer 210 is proximate a first side of the frequency-differentiating layer 103 (the two are separated only by the passivation layer 212 in this example). According to this example, the display stack 211 is proximate a second and opposing side of the frequency-differentiating layer 103 (the two are separated only by the adhesive layer 301 in this example).

According to this example, the ultrasonic sensor stack 305 includes a resonator 310f. Here, the resonator 310f includes the TFT layer 102 and the ultrasonic receiver layer 101. In this example, the resonator 310f is bounded by the electrode layer 210. According to this example, the resonator 310f corresponds to a quarter wavelength at a peak frequency of the higher-frequency area 225b. In some alternative examples, the resonator 310f may correspond to an odd multiple of the quarter wavelength at a peak frequency of the higher-frequency area 225b.

Figure 7:
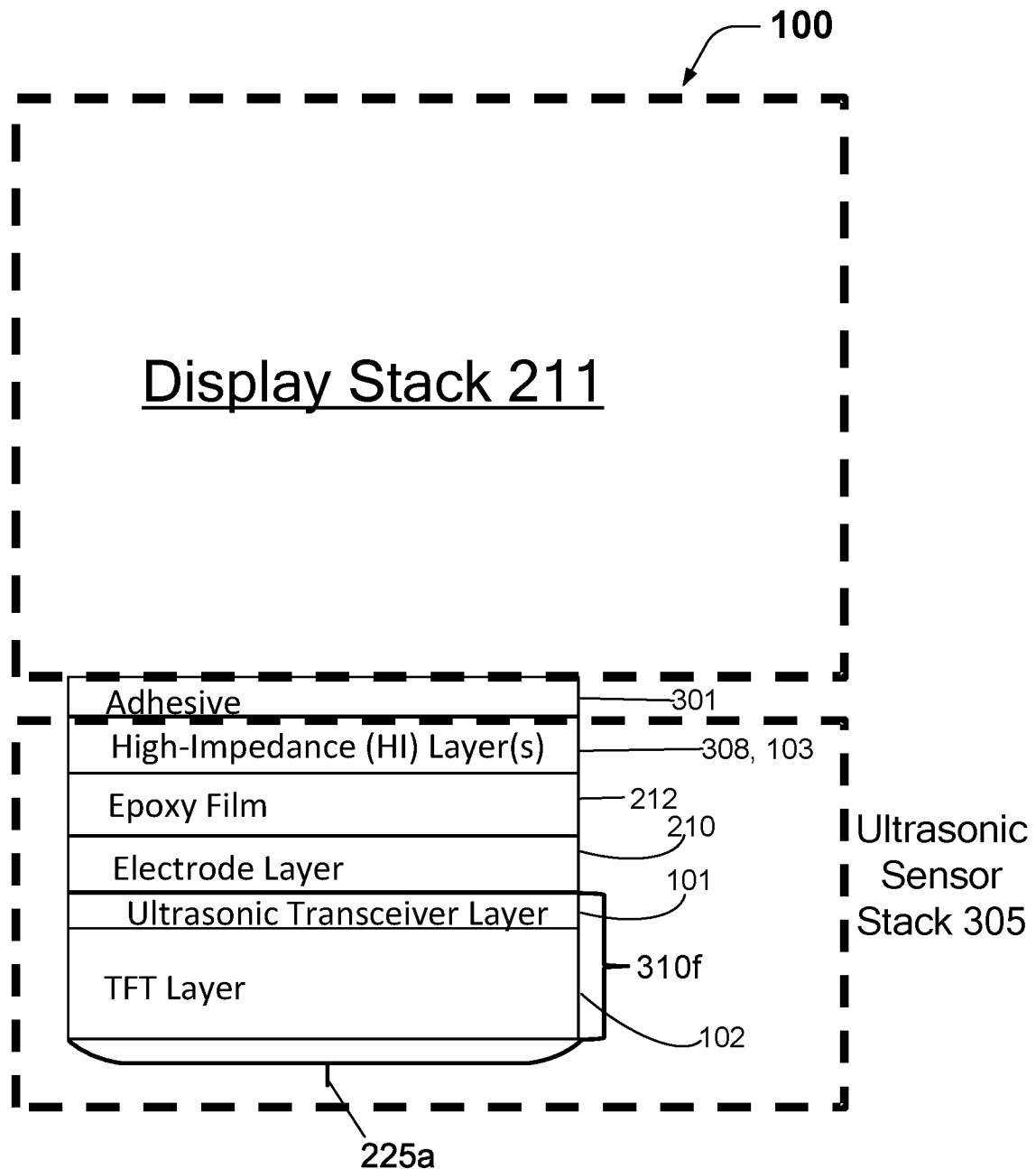
FIG. 7 shows an alternative example of an ultrasonic sensor stack in a lower-frequency area of an ultrasonic sensor system.

FIG. 7 shows an alternative example of an ultrasonic sensor stack in a lower-frequency area of an ultrasonic sensor system. As with other disclosed implementations, the types, number and arrangement of elements shown in FIG. 7 are merely examples. Other implementations may include different types, numbers and/or arrangements of elements.

In this example, the apparatus 100 is an instance of the apparatus 100 shown in FIG. 1B. According to this example, the apparatus 100 includes an ultrasonic sensor stack 305 and a display stack 211. Here, the ultrasonic sensor stack 305 is attached to the display stack 211 via an adhesive layer 301. In this instance, as in some other disclosed implementations, the ultrasonic sensor stack 305 includes a frequency-differentiating layer 103 that resides between the TFT layer 102 and the display stack 211. In this example, the frequency-differentiating layer 103 of the lower-frequency area 225a includes one or more high-impedance layers 308.

However, according to this example, the electrode layer 210, TFT layer 102 and the ultrasonic receiver layer 101 have a different configuration than shown in FIGS. 2-5C. In this implementation, the electrode layer 210 resides between the ultrasonic transceiver layer 101 and the frequency-differentiating layer 103. In this example, the electrode layer 210 is proximate a first side of the frequency-differentiating layer 103 (the two are separated only by the passivation layer 212 in this example). According to this example, the display stack 211 is proximate a second and opposing side of the frequency-differentiating layer 103 (the two are separated only by the adhesive layer 301 in this example). According to this example, the ultrasonic sensor stack 305 includes an instance of the resonator 310f that is described above with reference to FIG. 6.

As noted elsewhere herein, various disclosed implementations of the apparatus 100 may be configured to perform one or more types of authentication procedures. Some implementations may be configured to perform an authentication process that is based, at least in part, on ultrasonic image data corresponding to fingerprint features. Alternatively, or additionally, some implementations may be configured to perform an authentication process that is based, at least in part, on ultrasonic image data corresponding to sub-epidermal features. Some such implementations may involve obtaining image data corresponding to sub-epidermal features, determining biometric template data corresponding to the obtained image data and comparing the determined biometric template data with stored biometric template data of a rightful user.

Alternatively, or additionally, some implementations may be configured to perform an authentication process that is based, at least in part, on a liveness determination, e.g., based on information obtained from ultrasonic image data corresponding to sub-epidermal features. The liveness determination may be made in a variety of ways, depending on the particular implementation. In addition to providing information regarding sub-epidermal features of a target object, such as structures within a finger, in some implementations temporal changes in the time difference between reflections of simple A-scans, obtained at two or more different times, may be used to detect liveness. As used herein, the term "A-scan" refers to ultrasonic image data received by an electrode portion of an ultrasonic sensor system, such as the electrode layer 210 shown in FIGS. 2-7. In alternative implementations, an "A-scan" may be received by a single ultrasonic receiver pixel, or a group of neighboring ultrasonic receiver pixels, of an ultrasonic receiver pixel array (such as the array of sensor pixels 206 shown in FIG. 2 and described above).

Figure 8A:
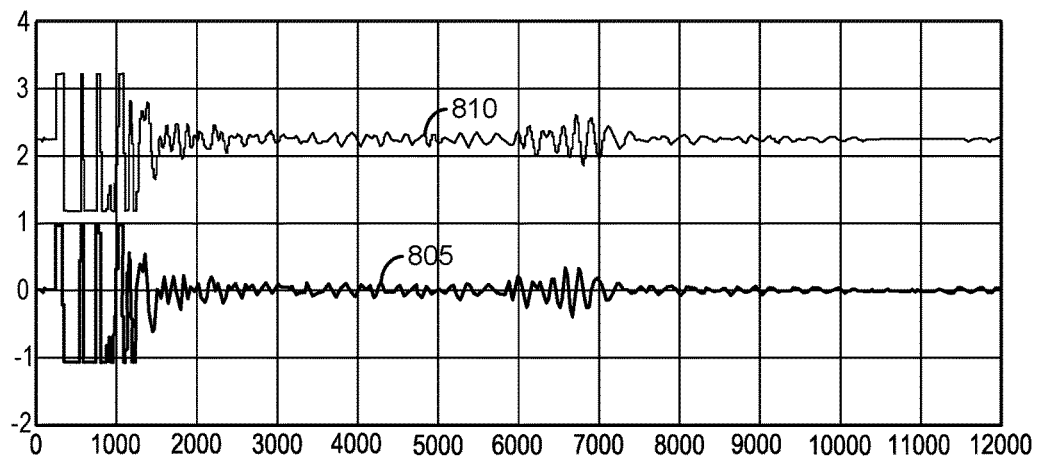
FIGS. 8A-8C are graphs that show an example of a time difference between reflections of two A-scans.
Figure 8B:
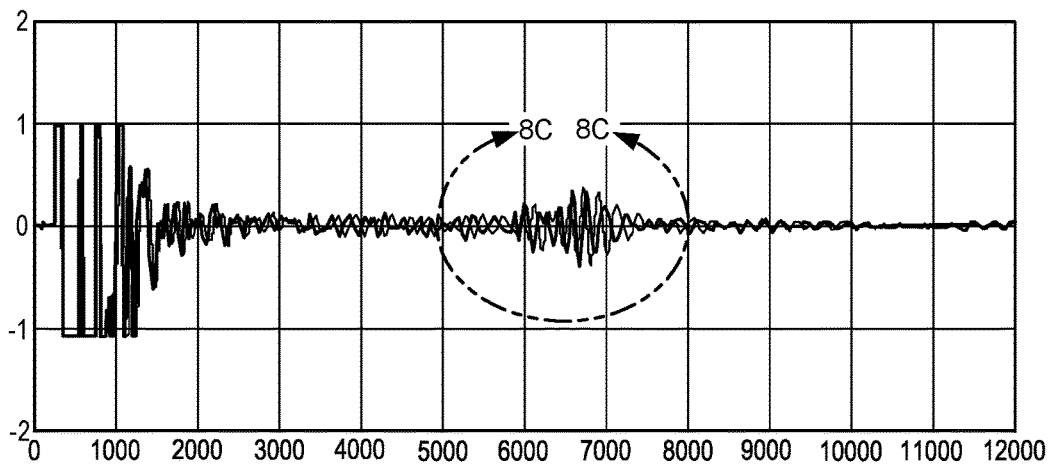
Figure 8C:
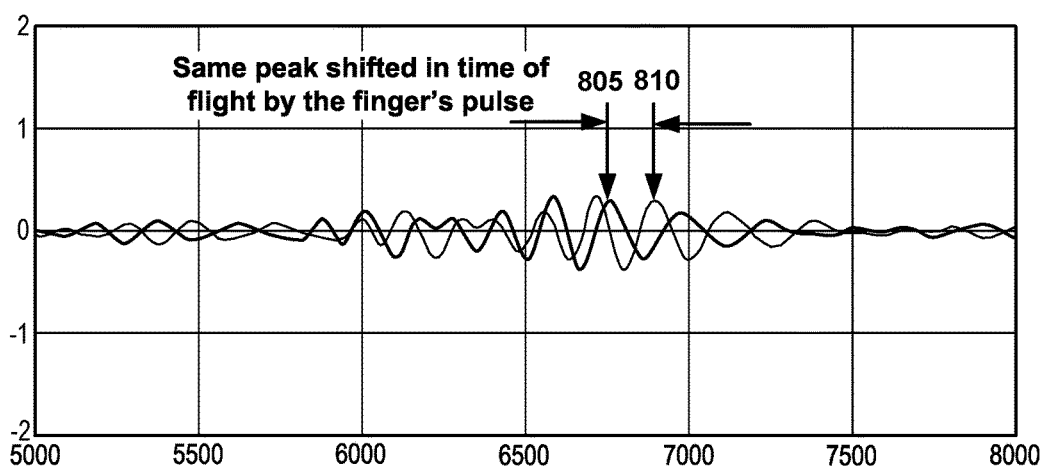

FIGS. 8A-8C are graphs that show an example of a time difference between reflections of two A-scans. FIG. 8A shows an A-scan plot 805, which was obtained at a first time, and an A-scan plot 810 that was obtained at a second time. FIG. 8B shows the A-scan plots 805 and 810 superimposed along the same vertical axis. FIG. 8C is an enlarged view of the corresponding region within dashed lines, labeled 8C, in FIG. 8B. In this example, time differences between the A-scan plots 805 and 810 are caused by tissue expansion and contraction as blood pulses through the finger's vascular system. This expansion and contraction due to pulse activity can be seen in the A-scan plot as a small shift in the time of flight of the plotted return echoes.

Depth imaging and processing of the acquired images can take inordinate resources of power and processing capability in mobile devices. In some implementations, depth images of selected pores, follicles or other epidermal or sub-epidermal features may be acquired, analyzed and compared to enrollment templates to detect a spoof attempt, minimizing processing time and power while ascertaining liveness and determining whether the user is to be authenticated or otherwise validated.

Figure 9:
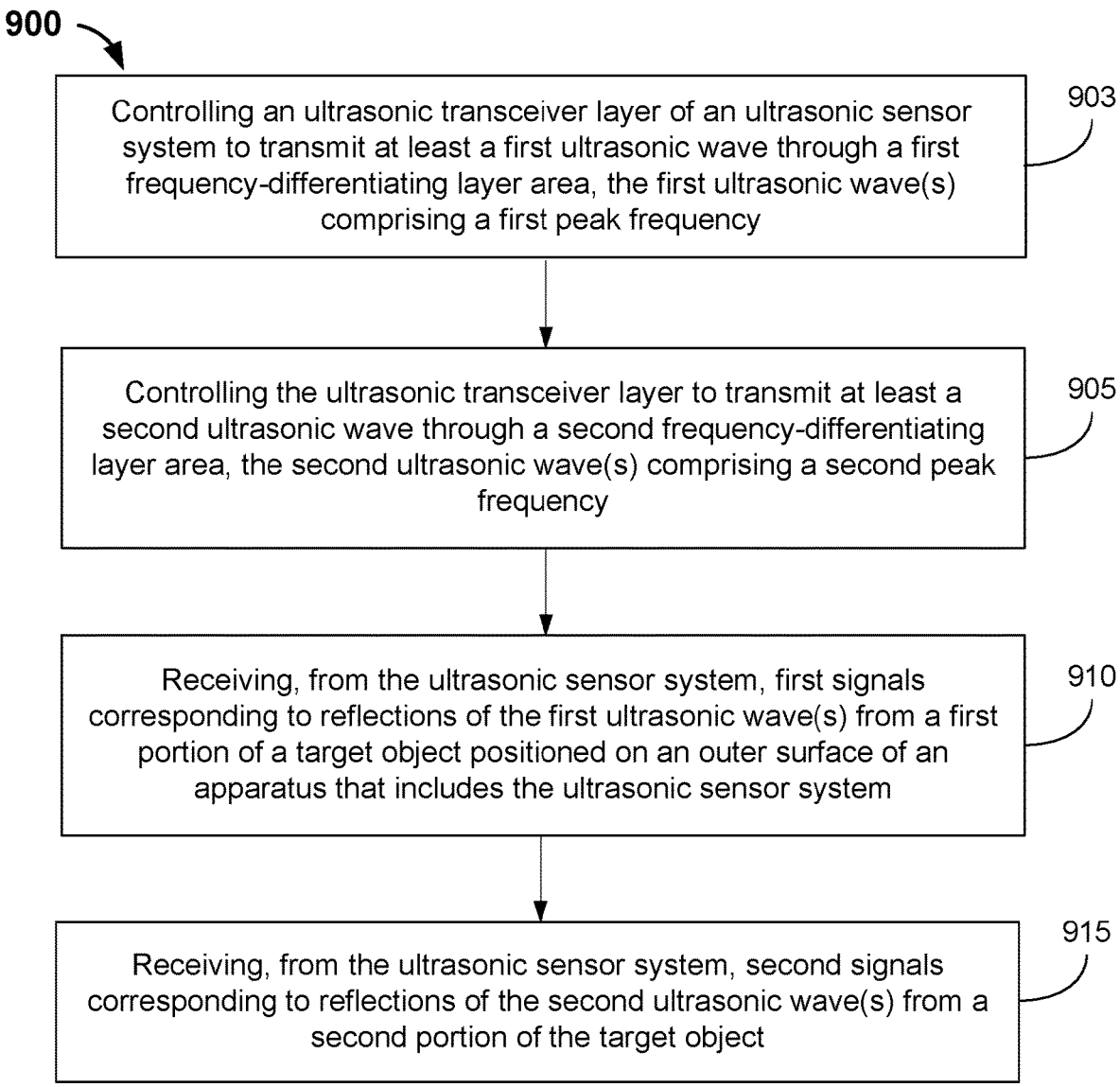
FIG. 9 is a flow diagram that provides examples of operations according to some disclosed methods.

FIG. 9 is a flow diagram that provides examples of operations according to some disclosed methods. The blocks of FIG. 9 may, for example, be performed by the apparatus 100 of FIG. 1B (e.g., by the control system 106 and the ultrasonic sensor system 105), or by a similar apparatus that includes a frequency-differentiating layer. As with other methods disclosed herein, the method outlined in FIG. 9 may include more or fewer blocks than indicated. Moreover, the blocks of methods disclosed herein are not necessarily performed in the order indicated. In some instances, one or more blocks may be performed concurrently.

In this example, block 903 involves controlling (e.g., via the control system 106) an ultrasonic transceiver layer of an ultrasonic sensor system (e.g., ultrasonic sensor system 105) to transmit at least a first ultrasonic wave through a first frequency-differentiating layer area. Here, the first ultrasonic wave(s) include a first peak frequency. According to this implementation, the first frequency-differentiating layer area is in a lower-frequency area of an ultrasonic sensor system (e.g., the lower-frequency area 225a that is described above). In some examples, the first peak frequency may be in the range of 1 MHz to 10 MHz.

According to this implementation, block 905 involves controlling (e.g., via the control system 106) the ultrasonic transceiver layer to transmit at least a second ultrasonic wave through a second frequency-differentiating layer area. Here, the second ultrasonic wave(s) include a second peak frequency. According to this example, the second frequency-differentiating layer area is in a higher-frequency area of the ultrasonic sensor system (e.g., the higher-frequency area 225b that is described above). In some examples, the second peak frequency may be in the range of 10 MHz to 20 MHz. In some examples, the first ultrasonic wave(s) and the second ultrasonic wave(s) may be portions of the same ultrasonic wave(s). For example, the ultrasonic transceiver layer 101 may transmit one or more ultrasonic waves, a first portion of which passes through the first frequency-differentiating layer area and a second portion of which passes through the second frequency-differentiating layer area.

In this example, block 910 involves receiving (e.g., by the control system 106), from the ultrasonic sensor system, first signals corresponding to reflections of the first ultrasonic wave(s) from a first portion of a target object positioned on an outer surface of an apparatus that includes the ultrasonic sensor system. According to some examples, the first signals may correspond to reflections from an interior of the first portion of the target object. If the target object is a finger, the first signals may correspond to reflections of the first ultrasonic wave(s) from a subsurface of the finger, e.g., of reflections from one or more sub-epidermal features.

In this example, block 915 involves receiving (e.g., by the control system 106), from the ultrasonic sensor system, second signals corresponding to reflections of the second ultrasonic wave(s) from a second portion of the target object. The second signals may, for example, correspond to reflections of the second ultrasonic wave(s) from a surface of the second portion of the target object. If the target object is a finger, the second signals may correspond to reflections of the second ultrasonic wave(s) from a surface of the finger, e.g., from ridges and valleys of a fingerprint.

According to some implementations, method 900 may involve performing (e.g., by the control system 106) an authentication process that is based, at least in part, on the first signals and/or the second signals. In some implementations, method 900 may involve controlling access to the apparatus, or to another device, based at least in part on the authentication process. In some examples, method 900 may involve performing a liveness detection process that is based, at least in part, on the first signals. The liveness detection process may be part of an authentication process.

According to some implementations, method 900 may involve obtaining fingerprint data based on portions of the second signals received within a time interval corresponding with fingerprints. The time interval may, for example, be measured relative to a time at which the first ultrasonic wave is transmitted. Obtaining the fingerprint data may, for example, involve extracting, via a control system, target object features from the second signals. The target object features may, for example, comprise fingerprint features. According to some examples, the fingerprint features may include fingerprint minutiae, keypoints and/or sweat pores. In some examples, the fingerprint features may include ridge ending information, ridge bifurcation information, short ridge information, ridge flow information, island information, spur information, delta information, core information, etc.

In some examples, method 900 may involve comparing the fingerprint features with fingerprint features of an authorized user. The fingerprint features of the authorized user may, for example, have been received during a previous enrollment process.

In some implementations, method 900 may involve extracting sub-epidermal features from the first signals. Sub-epidermal features of the authorized user may, for example, have been received during a previous enrollment process. According to some implementations, the authentication process may involve comparing sub-epidermal features extracted from the first signals with sub-epidermal features of the authorized user.

In some such implementations, the sub-epidermal features may include sub-epidermal layer information corresponding to reflections of the first ultrasonic wave received from the first portion of the target object within a time interval corresponding with a sub-epidermal region. The sub-epidermal features may, for example, include dermis layer information corresponding to reflections of the second ultrasonic wave received from the portion of the target object. The dermis layer information may have been obtained within a time interval corresponding with a dermis layer. The authentication process may be based, at least in part, on the dermis layer information. Alternatively, or additionally, the sub-epidermal features may include information regarding other sub-epidermal layers, such as those described above with reference to FIG. 1A. According to some implementations, the authentication process may be based, at least in part, on both the first signals and the second signals.

Figure 10:
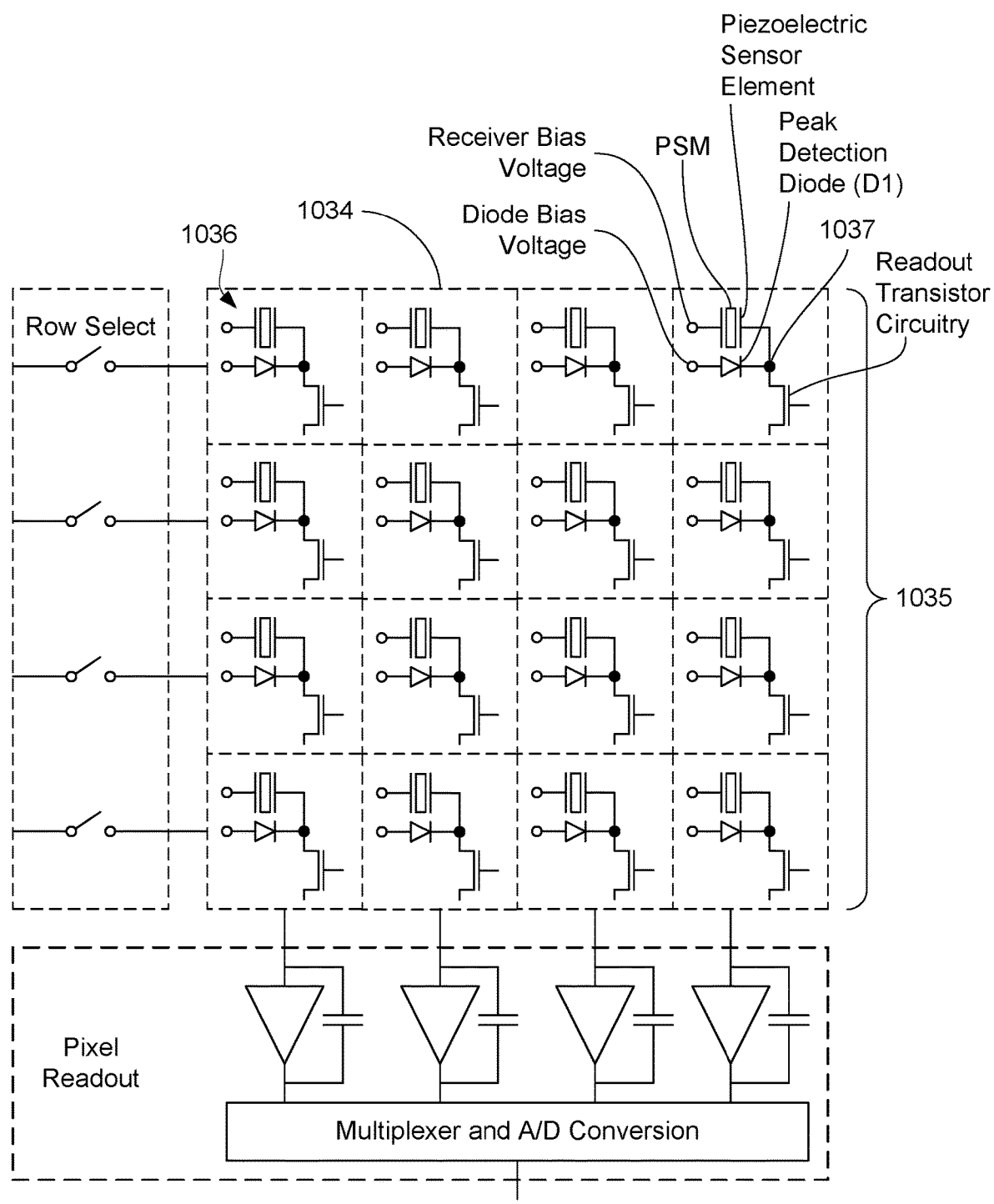
FIG. 10 representationally depicts aspects of a 4×4 pixel array of sensor pixels for an ultrasonic sensor system.

FIG. 10 representationally depicts aspects of a 4×4 pixel array of sensor pixels for an ultrasonic sensor system. Each pixel 1034 may be, for example, associated with a local region of piezoelectric sensor material (PSM), a peak detection diode (D1) and a readout transistor (M3); many or all of these elements may be formed on or in a substrate to form the pixel circuit 1036. In practice, the local region of piezoelectric sensor material of each pixel 1034 may transduce received ultrasonic energy into electrical charges. The peak detection diode D1 may register the maximum amount of charge detected by the local region of piezoelectric sensor material PSM. Each row of the pixel array 1035 may then be scanned, e.g., through a row select mechanism, a gate driver, or a shift register, and the readout transistor M3 for each column may be triggered to allow the magnitude of the peak charge for each pixel 1034 to be read by additional circuitry, e.g., a multiplexer and an A/D converter. The pixel circuit 1036 may include one or more TFTs to allow gating, addressing, and resetting of the pixel 1034.

Each pixel circuit 1036 may provide information about a small portion of the object detected by the ultrasonic sensor system. While, for convenience of illustration, the example shown in FIG. 10 is of a relatively coarse resolution, ultrasonic sensors having a resolution on the order of 500 pixels per inch or higher may be configured with an appropriately scaled structure. The detection area of the ultrasonic sensor system may be selected depending on the intended object of detection. For example, the detection area may range from about 5 mm×5 mm for a single finger to about 3 inches×3 inches for four fingers. Smaller and larger areas, including square, rectangular and non-rectangular geometries, may be used as appropriate for the target object.

Implementation examples are described in the following numbered clauses:

1. An apparatus including an ultrasonic sensor system, the ultrasonic sensor system including: an ultrasonic transceiver layer; a frequency-differentiating layer, including a first frequency-differentiating layer area corresponding to a lower-frequency area of the ultrasonic sensor system and including a first material having a first acoustic impedance; and a second frequency-differentiating layer area corresponding to a higher-frequency area of the ultrasonic sensor system and including a second material having a second acoustic impedance, the first acoustic impedance being higher than the second acoustic impedance; and a thin-film transistor (TFT) layer residing between the ultrasonic transceiver layer and the frequency-differentiating layer, the TFT layer being proximate a first side of the frequency-differentiating layer.

2. The apparatus of clause 1, wherein the first material includes a high-impedance layer.

3. The apparatus of clause 2, wherein the high-impedance layer includes steel, nickel, cupronickel, copper or glass.

4. The apparatus of any one of clauses 1-3, wherein the second material includes a low-impedance layer.

5. The apparatus of clause 4, wherein the low-impedance layer includes at least one of polyimide, polycarbonate or polyethylene terephthalate.

6. The apparatus of any one of clauses 1-5, further comprising a display stack proximate a second side of the frequency-differentiating layer.

7. The apparatus of any one of clauses 1-6, wherein the frequency-differentiating layer includes an adhesive layer in the second frequency-differentiating layer area.

8. The apparatus of any one of clauses 1-7, wherein the frequency-differentiating layer further includes a first resonator in the second frequency-differentiating layer area, the first resonator including the second material.

9. The apparatus of clause 8, wherein the TFT layer is proximate a first side of the first resonator and wherein a high-impedance layer is proximate a second side of the first resonator, the high-impedance layer having a higher acoustic impedance than that of the second material.

10. The apparatus of clause 8 or clause 9, wherein the first resonator has a thickness corresponding to half of a wavelength and wherein the wavelength corresponds to a peak frequency of the higher-frequency area of the ultrasonic sensor system.

11. The apparatus of clause 10, wherein the peak frequency of the higher-frequency area is in a range of 10 MHz to 20 MHz.

12. The apparatus of any one of clauses 8-11, wherein the frequency-differentiating layer further includes a second resonator in the second frequency-differentiating layer area, the second resonator including the ultrasonic transceiver layer.

13. The apparatus of clause 12, wherein the TFT layer is proximate a first side of the second resonator and wherein the second resonator includes an electrode layer of the ultrasonic sensor system.

14. The apparatus of clause 12 or clause 13, wherein the second resonator has a thickness corresponding to one quarter of a wavelength corresponding to a peak frequency of the higher-frequency area of the ultrasonic sensor system.

15. The apparatus of any one of clauses 8-14, wherein the frequency-differentiating layer further includes a second resonator in the first frequency-differentiating layer area, the second resonator including the TFT layer and the ultrasonic transceiver layer.

16. The apparatus of clause 15, wherein the first material is proximate a first side of the second resonator and wherein the second resonator includes an electrode layer of the ultrasonic sensor system.

17. The apparatus of clause 15 or clause 16, wherein the second resonator has a thickness corresponding to one quarter of a wavelength and wherein the wavelength corresponds to a peak frequency of the lower-frequency area of the ultrasonic sensor system.

18. The apparatus of clause 17, wherein the peak frequency of the lower-frequency area is in a range of 1 MHz to 10 MHz.

19. The apparatus of any one of clauses 1-18, further including a control system configured to: control the ultrasonic transceiver layer to transmit a first ultrasonic wave through the first frequency-differentiating layer area, the first ultrasonic wave comprising a first peak frequency; control the ultrasonic transceiver layer to transmit a second ultrasonic wave through the second frequency-differentiating layer area, the second ultrasonic wave comprising a second peak frequency; receive, from the ultrasonic sensor system, first signals corresponding to reflections of the first ultrasonic wave from a first portion of a target object positioned on an outer surface of the apparatus; and receive, from the ultrasonic sensor system, second signals corresponding to reflections of the second ultrasonic wave from a second portion of the target object.

20. The apparatus of clause 19, wherein the control system is configured to perform an authentication process that is based, at least in part, on the first signals, the second signals or combinations thereof.

21. The apparatus of clause 19 or clause 20, wherein the first signals comprise sub-epidermal layer information corresponding to reflections of the first ultrasonic wave received from the first portion of the target object within a time interval corresponding to a sub-epidermal region and wherein the control system is configured to perform a liveness detection process that is based, at least in part, on the first signals.

22. The apparatus of any one of clauses 1-21, wherein the apparatus resides within a mobile device.

Further implementation examples are described in the following numbered clauses:

23. An apparatus including an ultrasonic sensor system, the ultrasonic sensor system including: an ultrasonic transceiver layer; and a frequency-differentiating layer proximate a first side of the ultrasonic transceiver layer, the frequency-differentiating layer including: a first frequency-differentiating layer area corresponding to a lower-frequency area of the ultrasonic sensor system and including a first material having a first acoustic impedance and a first thickness and a second material having a second acoustic impedance, the first acoustic impedance being higher than the second acoustic impedance; and a second frequency-differentiating layer area corresponding to a higher-frequency area of the ultrasonic sensor system and including the first material having a second thickness and the second material, the first thickness being greater than the second thickness, wherein the first material of the frequency-differentiating layer comprises an electrode layer of the ultrasonic sensor system.

24. The apparatus of clause 23, wherein the first material comprises a conductive portion of printed circuit board material and wherein the second material comprises an insulating portion of the printed circuit board material.

25. The apparatus of clause 23 or clause 24, further including a high-impedance layer proximate a second side of the ultrasonic transceiver layer, the high-impedance layer having a higher acoustic impedance than that of the ultrasonic transceiver layer.

26. The apparatus of clause 25, wherein the high-impedance layer comprises a thin-film transistor (TFT) layer or a glass layer.

27. The apparatus of clause 25 or clause 26, further including a display stack proximate a first side of the high-impedance layer, wherein the ultrasonic transceiver layer is proximate a second side of the high-impedance layer.

Further implementation examples are described in the following numbered clauses:

28. An apparatus including an ultrasonic sensor system, the ultrasonic sensor system including: a thin-film transistor (TFT) layer; an ultrasonic transceiver layer; a frequency-differentiating layer, including: a first frequency-differentiating layer area corresponding to a lower-frequency area of the ultrasonic sensor system and including a first material having a first acoustic impedance; and a second frequency-differentiating layer area corresponding to a higher-frequency area of the ultrasonic sensor system and including a second material having a second acoustic impedance, the first acoustic impedance being higher than the second acoustic impedance; and an electrode layer residing between the ultrasonic transceiver layer and the frequency-differentiating layer, the electrode layer being proximate a first side of the frequency-differentiating layer.

29. The apparatus of clause 28, wherein the first material comprises steel, nickel, cupronickel, copper, glass or combinations thereof and wherein the second material comprises polyimide, polycarbonate, polyethylene terephthalate, or combinations thereof.

30. The apparatus of clause 28 or clause 29, further including a display stack proximate a second side of the frequency-differentiating layer.

Further implementation examples are described in the following numbered clauses:

31. An apparatus including a display stack including at least a first resonator, the first resonator having a first resonator peak frequency in a first frequency range; and an ultrasonic sensor system, including: an ultrasonic transceiver layer; an electrode layer proximate a first side of the ultrasonic transceiver layer; and a thin-film transistor (TFT) layer proximate a second side of the ultrasonic transceiver layer, wherein a second resonator of the apparatus includes one or more layers the ultrasonic sensor system, the second resonator having a second resonator peak frequency in the first frequency range.

32. The apparatus of clause 31, further including a high-impedance layer residing between the ultrasonic sensor system and the display stack.

33. The apparatus of clause 32, further including a low-impedance layer residing between the ultrasonic sensor system and the high-impedance layer, wherein a third resonator includes the low-impedance layer and is bounded by the high-impedance layer and the TFT layer, the third resonator having a third resonator peak frequency in the first frequency range.

34. The apparatus of clause 32 or clause 33, further including an adhesive layer residing between the high-impedance layer and the ultrasonic sensor system, wherein the second resonator includes the adhesive layer and is bounded by the high-impedance layer.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also may be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium, such as a non-transitory medium. The processes of a method or algorithm disclosed herein may be implemented in a processor-executable software module which may reside on a computer-readable medium. Computer-readable media include both computer storage media and communication media including any medium that may be enabled to transfer a computer program from one place to another. Storage media may be any available media that may be accessed by a computer. By way of example, and not limitation, non-transitory media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection may be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those having ordinary skill in the art, and the generic principles defined herein may be applied to other implementations without departing from the spirit or scope of this disclosure. Thus, the disclosure is not intended to be limited to the implementations shown herein, but is to be accorded the widest scope consistent with the claims, the principles and the novel features disclosed herein. The word "exemplary" is used exclusively herein, if at all, to mean "serving as an example, instance, or illustration." Any implementation described herein as "exemplary" is not necessarily to be construed as preferred or advantageous over other implementations.

Certain features that are described in this specification in the context of separate implementations also may be implemented in combination in a single implementation. Conversely, various features that are described in the context of a single implementation also may be implemented in multiple implementations separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products. Additionally, other implementations are within the scope of the following claims. In some cases, the actions recited in the claims may be performed in a different order and still achieve desirable results.

It will be understood that unless features in any of the particular described implementations are expressly identified as incompatible with one another or the surrounding context implies that they are mutually exclusive and not readily combinable in a complementary and/or supportive sense, the totality of this disclosure contemplates and envisions that specific features of those complementary implementations may be selectively combined to provide one or more comprehensive, but slightly different, technical solutions. It will therefore be further appreciated that the above description has been given by way of example only and that modifications in detail may be made within the scope of this disclosure.

The invention claimed is:

1. An apparatus comprising:
   an ultrasonic sensor system, comprising:
      an ultrasonic transceiver layer;
      a frequency-differentiating layer, comprising:
         a first frequency-differentiating layer area corresponding to a lower-frequency area of the ultrasonic sensor system and including a first material having a first acoustic impedance; and
         a second frequency-differentiating layer area corresponding to a higher-frequency area of the ultrasonic sensor system and including a second material having a second acoustic impedance, the first acoustic impedance being higher than the second acoustic impedance; and
      a thin-film transistor (TFT) layer residing between the ultrasonic transceiver layer and the frequency-differentiating layer, the TFT layer being proximate a first side of the frequency-differentiating layer.

2. The apparatus of claim 1, wherein the first material comprises a high-impedance layer.

3. The apparatus of claim 2, wherein the high-impedance layer comprises steel, nickel, cupronickel, copper or glass.

4. The apparatus of claim 1, wherein the second material comprises a low-impedance layer.

5. The apparatus of claim 4, wherein the low-impedance layer comprises at least one of polyimide, polycarbonate or polyethylene terephthalate.

6. The apparatus of claim 1, further comprising a display stack proximate a second side of the frequency-differentiating layer.

7. The apparatus of claim 1, wherein the frequency-differentiating layer comprises an adhesive layer in the second frequency-differentiating layer area.

8. The apparatus of claim 1, wherein the frequency-differentiating layer further comprises a first resonator in the second frequency-differentiating layer area, the first resonator including the second material.

9. The apparatus of claim 8, wherein the TFT layer is proximate a first side of the first resonator and wherein a high-impedance layer is proximate a second side of the first resonator, the high-impedance layer having a higher acoustic impedance than that of the second material.

10. The apparatus of claim 8, wherein the first resonator has a thickness corresponding to half of a wavelength and wherein the wavelength corresponds to a peak frequency of the higher-frequency area of the ultrasonic sensor system.

11. The apparatus of claim 10, wherein the peak frequency of the higher-frequency area is in a range of 10 MHz to 20 MHz.

12. The apparatus of claim 8, wherein the frequency-differentiating layer further comprises a second resonator in the second frequency-differentiating layer area, the second resonator including the ultrasonic transceiver layer.

13. The apparatus of claim 12, wherein the TFT layer is proximate a first side of the second resonator and wherein the second resonator includes an electrode layer of the ultrasonic sensor system.

14. The apparatus of claim 12, wherein the second resonator has a thickness corresponding to one quarter of a wavelength corresponding to a peak frequency of the higher-frequency area of the ultrasonic sensor system.

15. The apparatus of claim 8, wherein the frequency-differentiating layer further comprises a second resonator in the first frequency-differentiating layer area, the second resonator including the TFT layer and the ultrasonic transceiver layer.

16. The apparatus of claim 15, wherein the first material is proximate a first side of the second resonator and wherein the second resonator includes an electrode layer of the ultrasonic sensor system.

17. The apparatus of claim 15, wherein the second resonator has a thickness corresponding to one quarter of a wavelength and wherein the wavelength corresponds to a peak frequency of the lower-frequency area of the ultrasonic sensor system.

18. The apparatus of claim 17, wherein the peak frequency of the lower-frequency area is in a range of 1 MHz to 10 MHz.

19. The apparatus of claim 1, further comprising a control system configured to:
control the ultrasonic transceiver layer to transmit a first ultrasonic wave through the first frequency-differentiating layer area, the first ultrasonic wave comprising a first peak frequency;
control the ultrasonic transceiver layer to transmit a second ultrasonic wave through the second frequency-differentiating layer area, the second ultrasonic wave comprising a second peak frequency;
receive, from the ultrasonic sensor system, first signals corresponding to reflections of the first ultrasonic wave from a first portion of a target object positioned on an outer surface of the apparatus; and
receive, from the ultrasonic sensor system, second signals corresponding to reflections of the second ultrasonic wave from a second portion of the target object.

20. The apparatus of claim 19, wherein the control system is configured to perform an authentication process that is based, at least in part, on the first signals, the second signals or combinations thereof.

21. The apparatus of claim 19, wherein the first signals comprise sub-epidermal layer information corresponding to reflections of the first ultrasonic wave received from the first portion of the target object within a time interval corresponding to a sub-epidermal region and wherein the control system is configured to perform a liveness detection process that is based, at least in part, on the first signals.

22. The apparatus of claim 1, wherein the apparatus resides within a mobile device.

23. An apparatus comprising:
an ultrasonic sensor system, comprising:
an ultrasonic transceiver layer; and
a frequency-differentiating layer proximate a first side of the ultrasonic transceiver layer, the frequency-differentiating layer comprising:
a first frequency-differentiating layer area corresponding to a lower-frequency area of the ultrasonic sensor system and including a first material having a first acoustic impedance and a first thickness and a second material having a second acoustic impedance, the first acoustic impedance being higher than the second acoustic impedance; and
a second frequency-differentiating layer area corresponding to a higher-frequency area of the ultrasonic sensor system and including the first material having a second thickness and the second material, the first thickness being greater than the second thickness, wherein the first material of the frequency-differentiating layer comprises an electrode layer of the ultrasonic sensor system.

24. The apparatus of claim 23, wherein the first material comprises a conductive portion of printed circuit board material and wherein the second material comprises an insulating portion of the printed circuit board material.

25. The apparatus of claim 23, further comprising a high-impedance layer proximate a second side of the ultrasonic transceiver layer, the high-impedance layer having a higher acoustic impedance than that of the ultrasonic transceiver layer.

26. The apparatus of claim 25, wherein the high-impedance layer comprises a thin-film transistor (TFT) layer or a glass layer.

27. The apparatus of claim 25, further comprising a display stack proximate a first side of the high-impedance layer, wherein the ultrasonic transceiver layer is proximate a second side of the high-impedance layer.

28. An apparatus comprising:
an ultrasonic sensor system, comprising:
a thin-film transistor (TFT) layer;
an ultrasonic transceiver layer;
a frequency-differentiating layer, comprising:
a first frequency-differentiating layer area corresponding to a lower-frequency area of the ultrasonic sensor system and including a first material having a first acoustic impedance; and
a second frequency-differentiating layer area corresponding to a higher-frequency area of the ultrasonic sensor system and including a second material having a second acoustic impedance, the first acoustic impedance being higher than the second acoustic impedance; and
an electrode layer residing between the ultrasonic transceiver layer and the frequency-differentiating layer, the electrode layer being proximate a first side of the frequency-differentiating layer.

29. The apparatus of claim 28, wherein the first material comprises steel, nickel, cupronickel, copper, glass or combinations thereof and wherein the second material comprises polyimide, polycarbonate, polyethylene terephthalate, or combinations thereof.

30. The apparatus of claim 28, further comprising a display stack proximate a second side of the frequency-differentiating layer.

31. An apparatus comprising:
  a display stack including at least a first resonator, the first resonator having a first resonator peak frequency in a first frequency range; and
  an ultrasonic sensor system, comprising:
    an ultrasonic transceiver layer;
    an electrode layer proximate a first side of the ultrasonic transceiver layer; and
    a thin-film transistor (TFT) layer proximate a second side of the ultrasonic transceiver layer, wherein a second resonator of the apparatus includes one or more layers the ultrasonic sensor system, the second resonator having a second resonator peak frequency in the first frequency range.

32. The apparatus of claim 31, further comprising a high-impedance layer residing between the ultrasonic sensor system and the display stack.

33. The apparatus of claim 32, further comprising a low-impedance layer residing between the ultrasonic sensor system and the high-impedance layer, wherein a third resonator includes the low-impedance layer and is bounded by the high-impedance layer and the TFT layer, the third resonator having a third resonator peak frequency in the first frequency range.

34. The apparatus of claim 32, further comprising an adhesive layer residing between the high-impedance layer and the ultrasonic sensor system, wherein the second resonator includes the adhesive layer and is bounded by the high-impedance layer.

* * * * *